United States Patent [19]

Wever et al.

[11] Patent Number: 4,663,776

[45] Date of Patent: * May 5, 1987

[54] SYSTEM FOR ACCESSING ELECTRICAL CIRCUITS AND RELAY SWITCH THEREOF

[75] Inventors: Ruben Wever, San Jose; Lorin D. Allred, Sunnyvale; Marco A. Ruiz, Milpitas, all of Calif.

[73] Assignee: Wiltron Company, Morgan Hill, Calif.

[ * ] Notice: The portion of the term of this patent subsequent to Jun. 25, 2002 has been disclaimed.

[21] Appl. No.: 725,125

[22] Filed: Apr. 19, 1985

Related U.S. Application Data

[63] Continuation of Ser. No. 447,753, Dec. 8, 1982, Pat. No. 4,525,605.

[51] Int. Cl.$^4$ ............................................. H04M 3/32
[52] U.S. Cl. ...................................................... 379/29
[58] Field of Search ................. 179/175.2 R, 175.3 R, 179/175.23, 95, 158; 364/900, 480, 481, 550, 580

[56] References Cited

U.S. PATENT DOCUMENTS 4,076,970 2/1978 Lubarsky et al. ............. 179/175.2 R Primary Examiner—Stafford D. Schreyer
Attorney, Agent, or Firm—Fliesler, Dubb, Meyer & Lovejoy

[57] ABSTRACT

A system for accessing a plurality of telephone wires which are two-wire, four-wire and six-wire circuits, including a common access test bus, a common control bus, a plurality of access shelves for connecting the circuits to the common access test bus, in which each access shelf is individually selectively controllable to connect the circuits to the common access test bus in response to control signals on the common control bus, and a test controller having a programmable data processor for selectively generating the control signals to individually control any one of the access shelves.

The relay switch of the system for closing and splitting twelve wires includes a first relay having twelve contacts, corresponding to the twelve wires, respectively, for closing the twelve wires and for splitting the twelve wires into twenty-four wires, a second relay, having twelve contacts, for closing a first twelve of the twenty-four wires, each of two of these twelve contacts being on two of the first twelve wires, respectively, and a third relay, having twelve contacts, for closing a second twelve of the twenty-four wires, each of two of these twelve contacts being on two of the second twelve wires, respectively.

28 Claims, 20 Drawing Figures

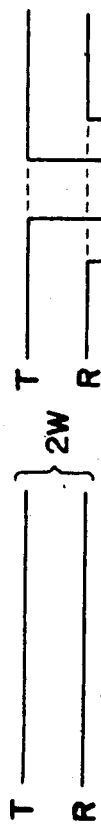
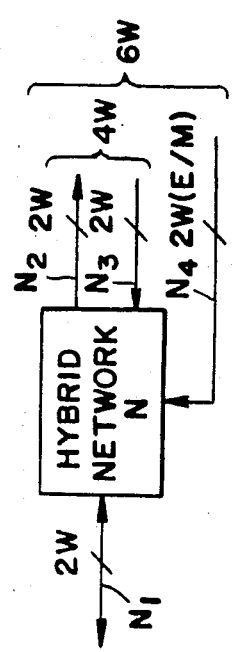
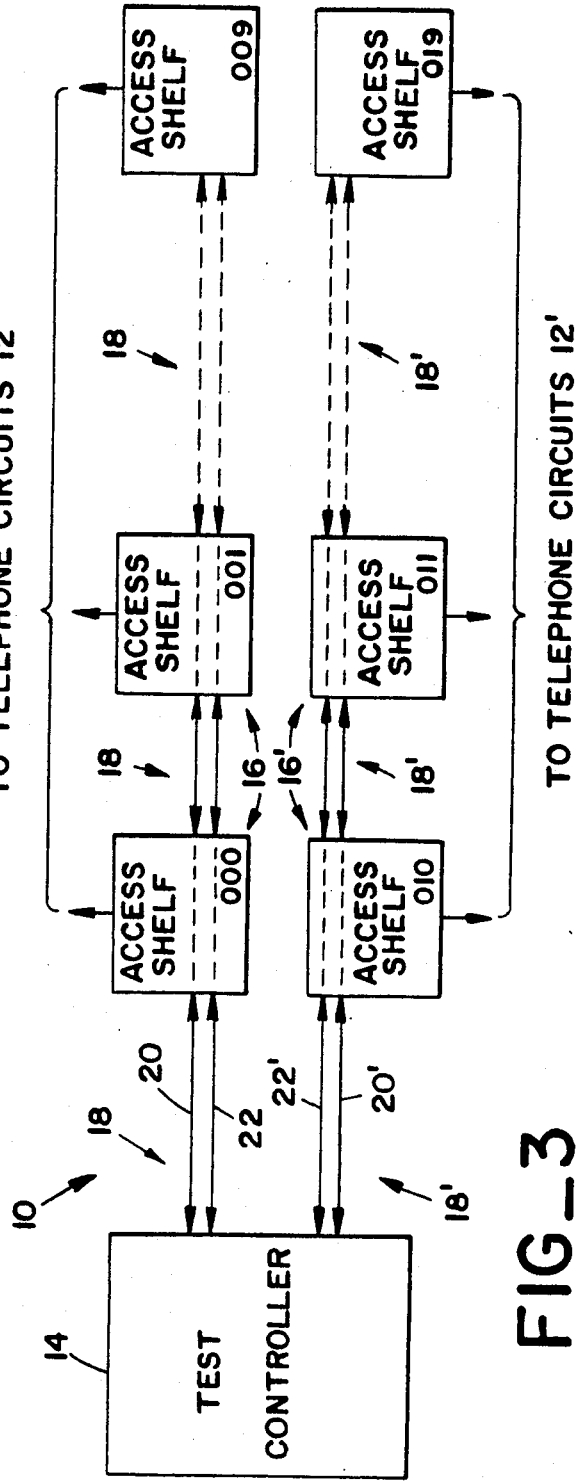

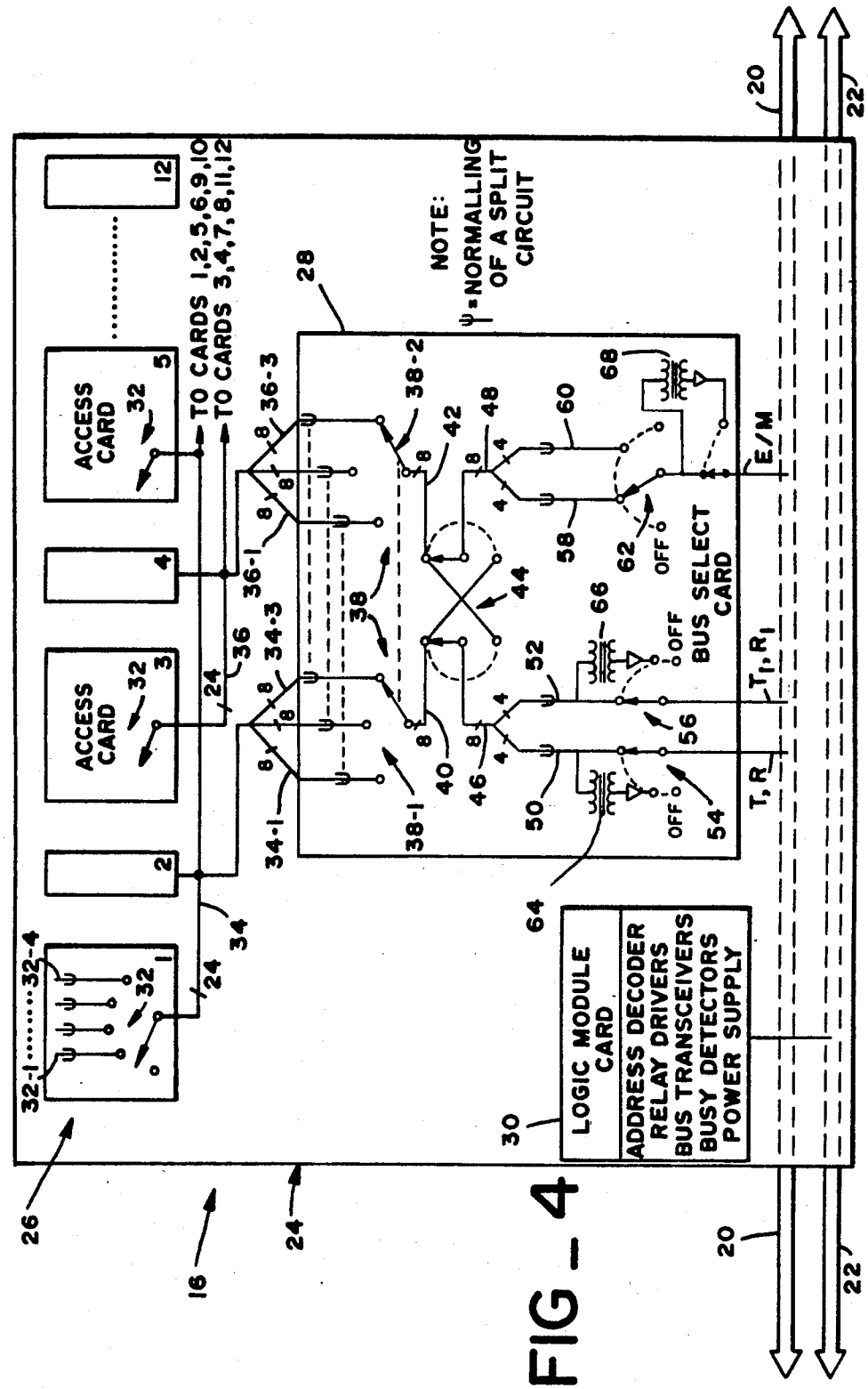
FIG_4

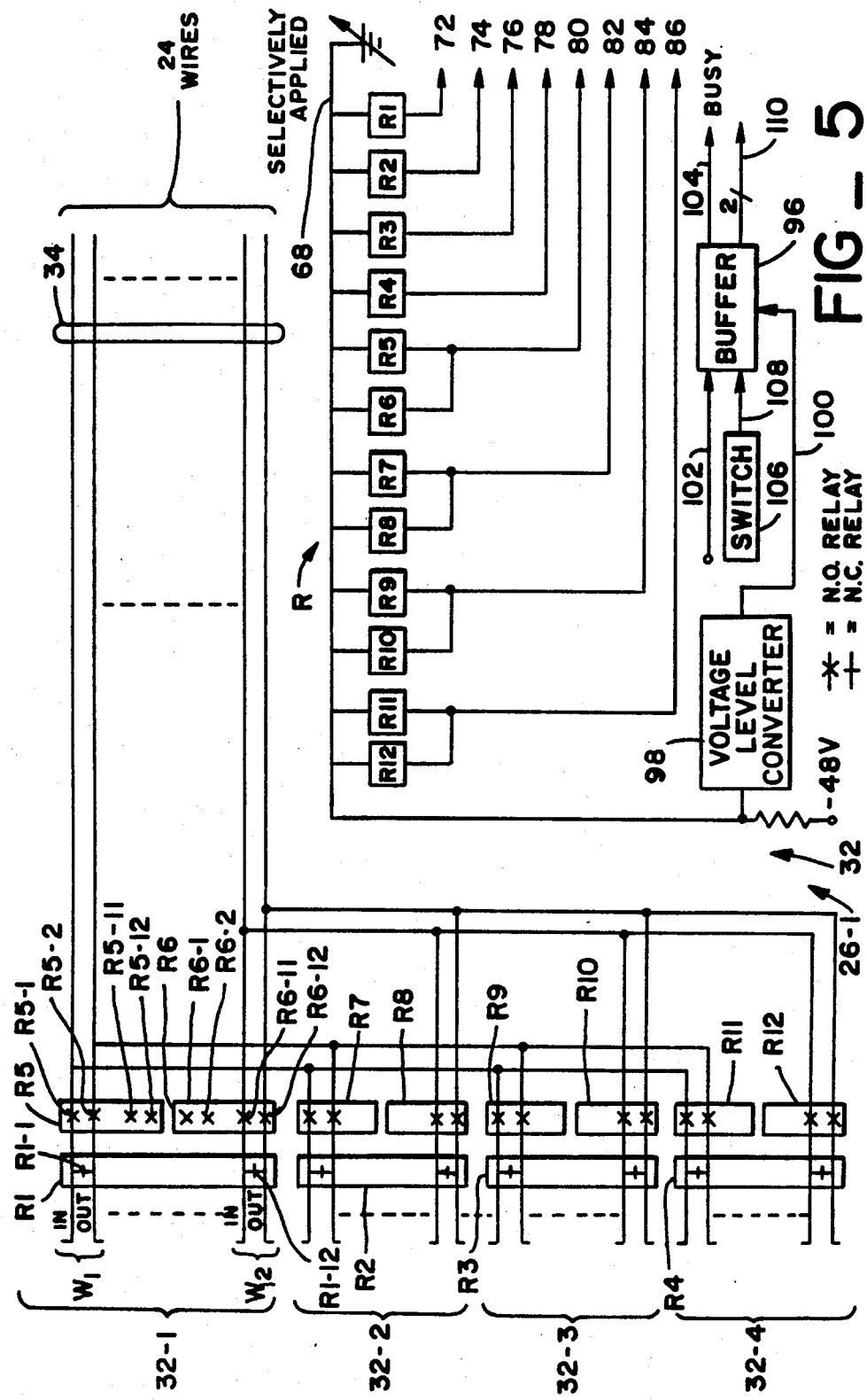

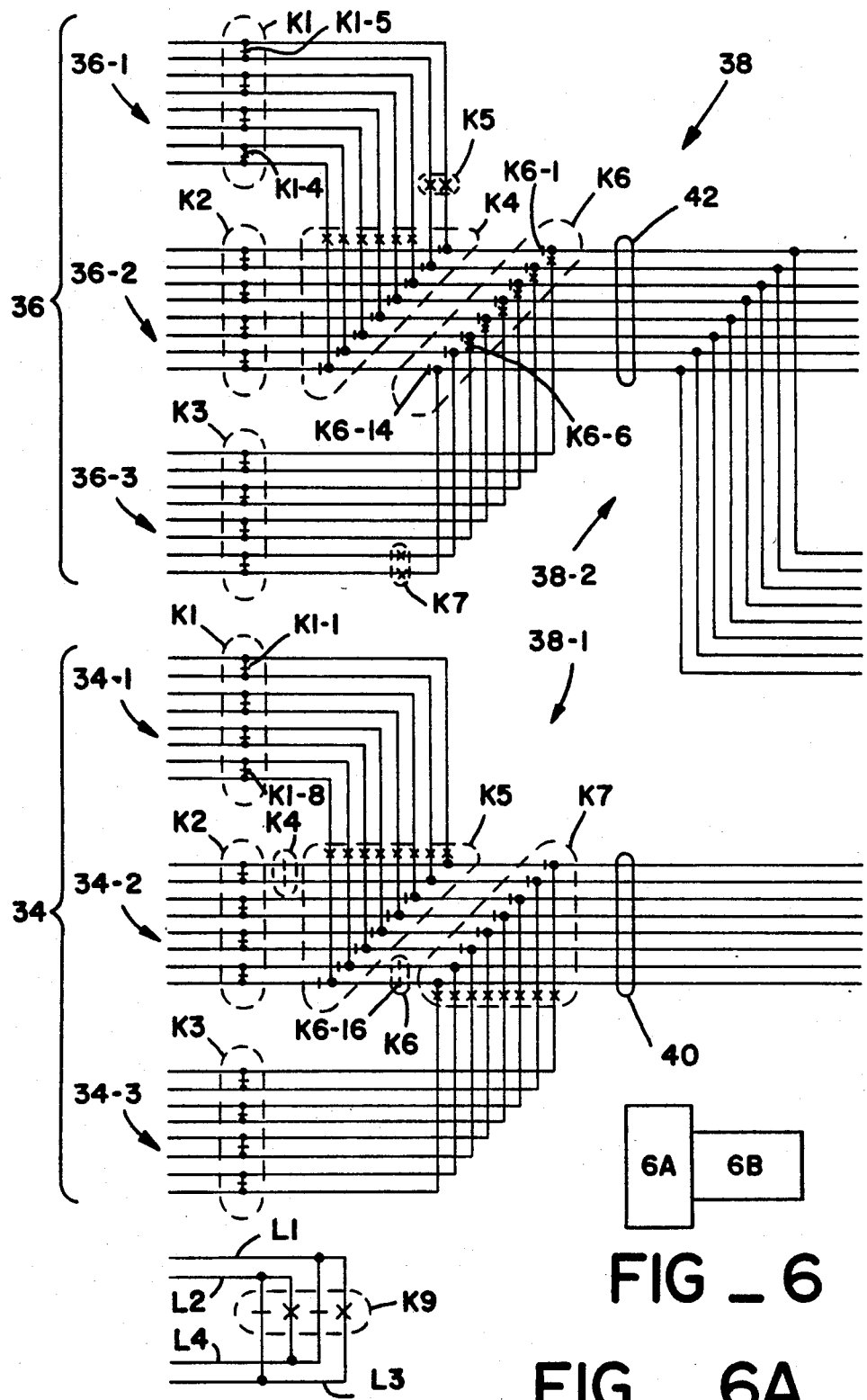
FIG _ 6
FIG _ 6A

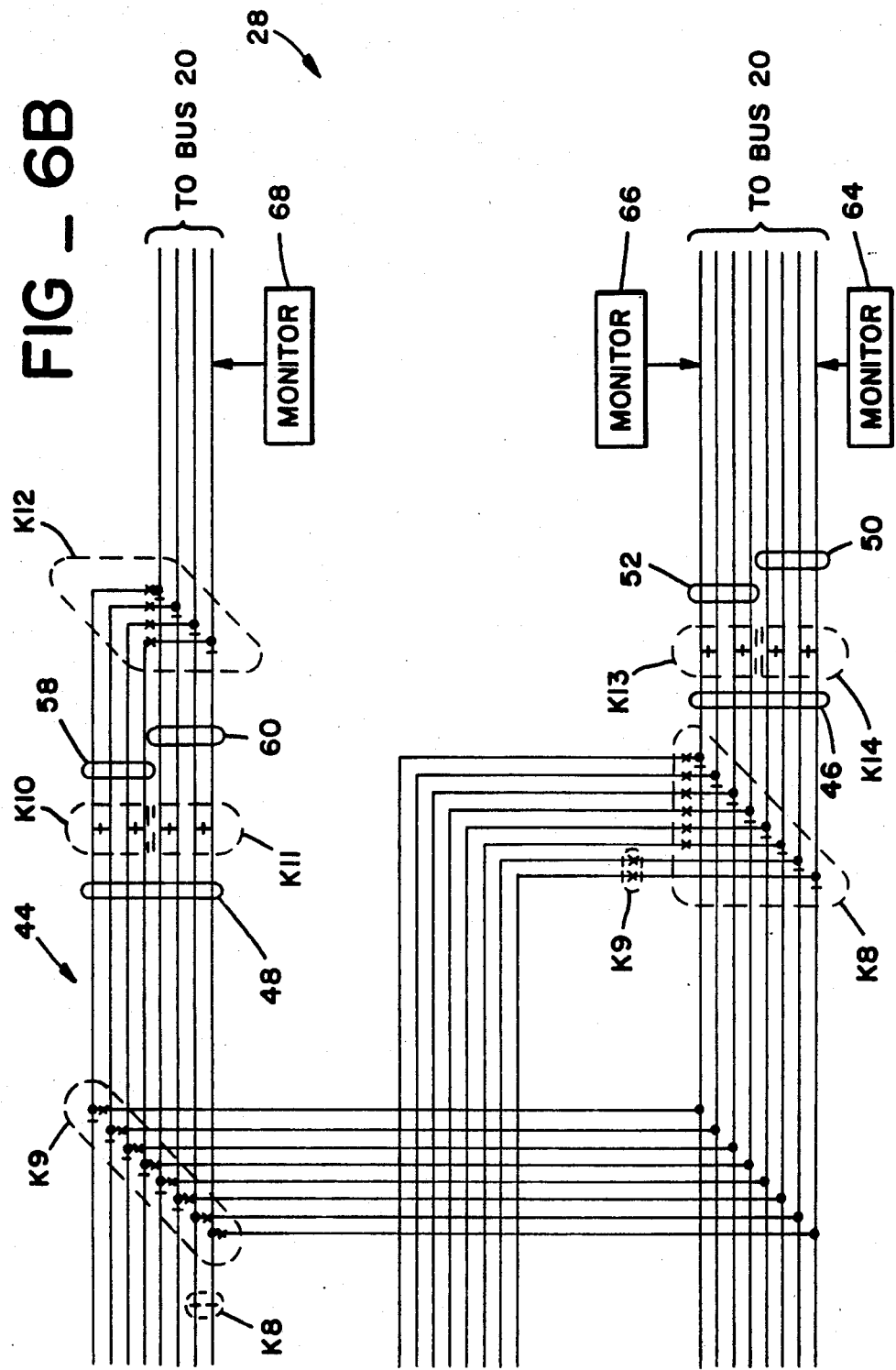

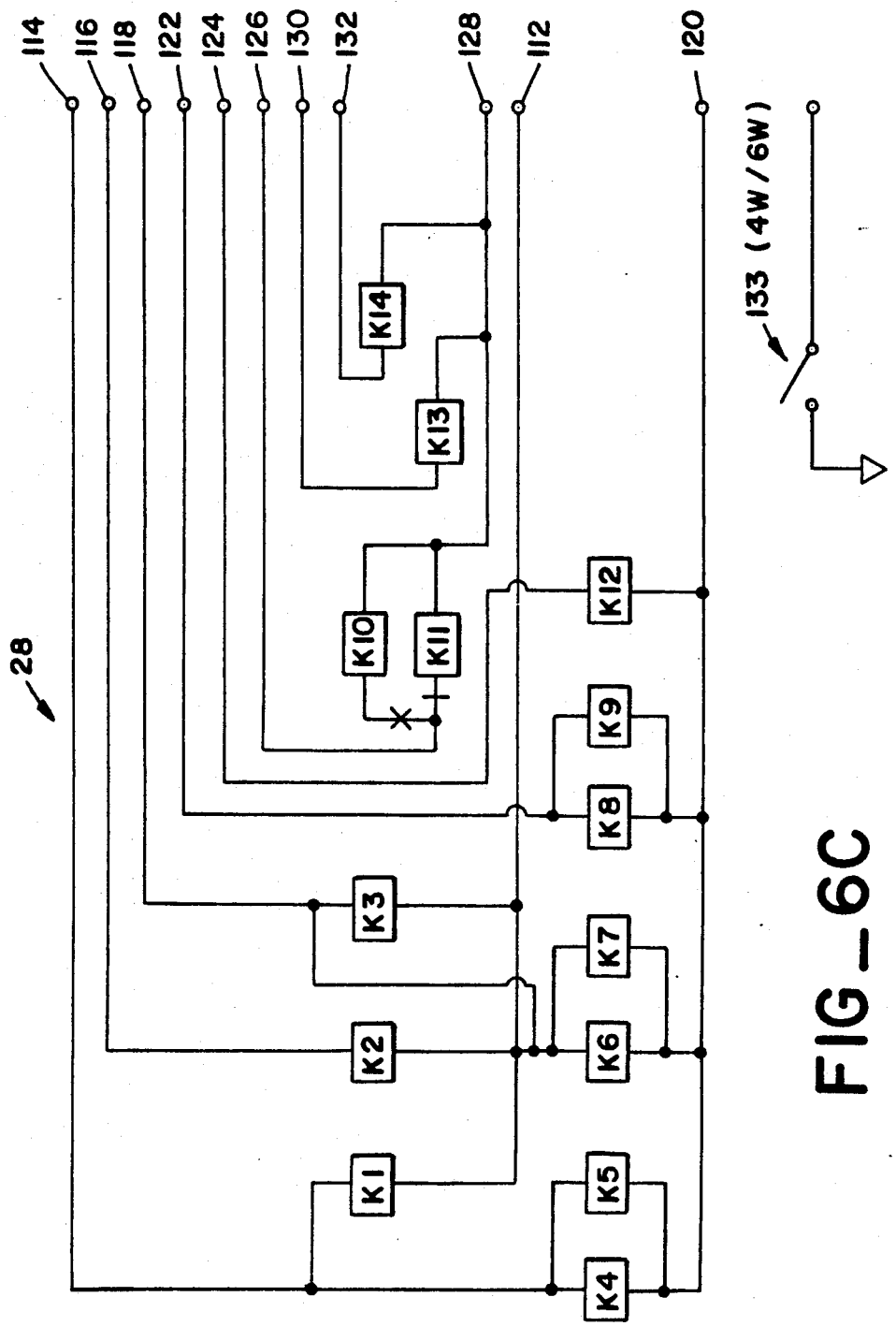
FIG_6C

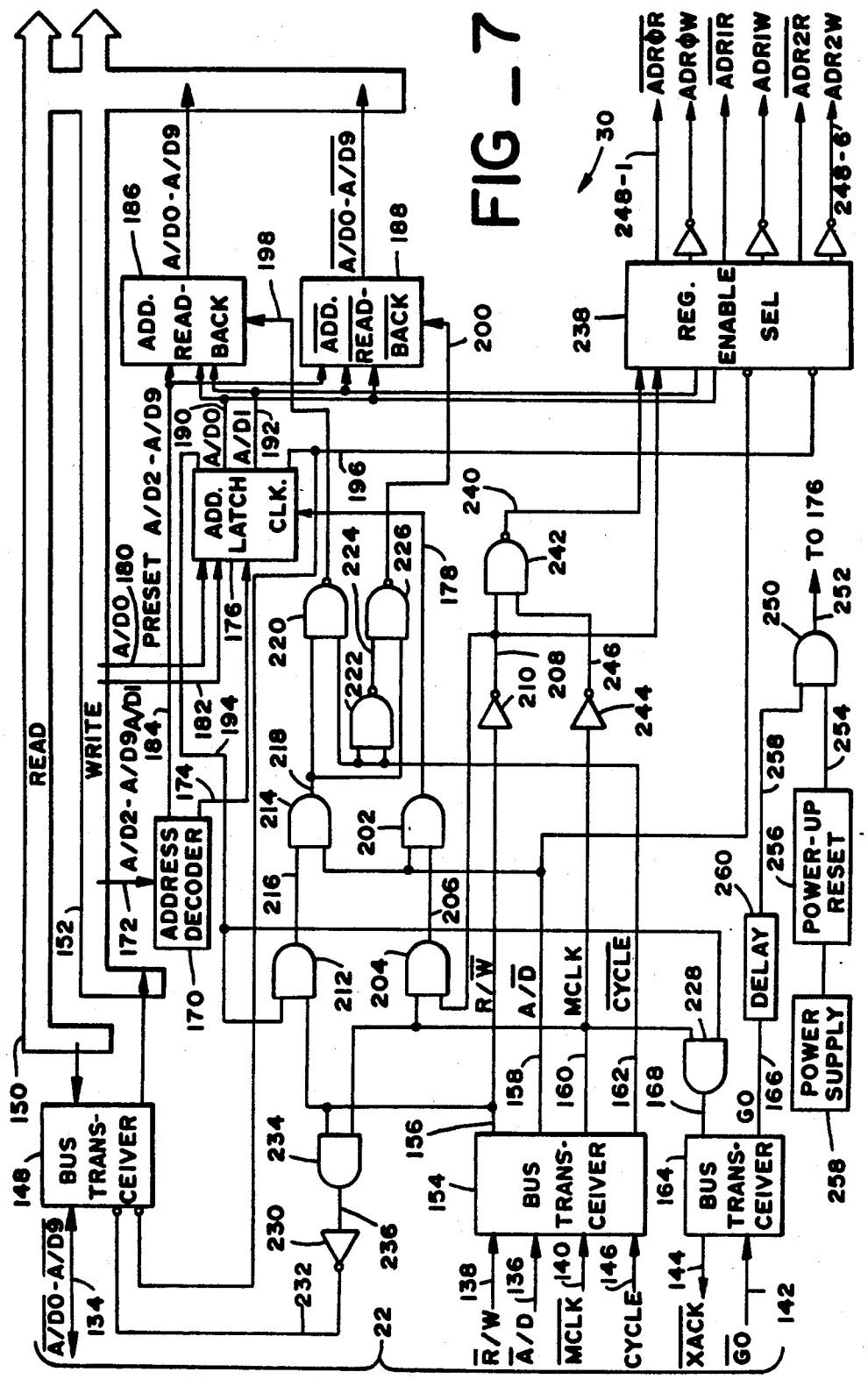

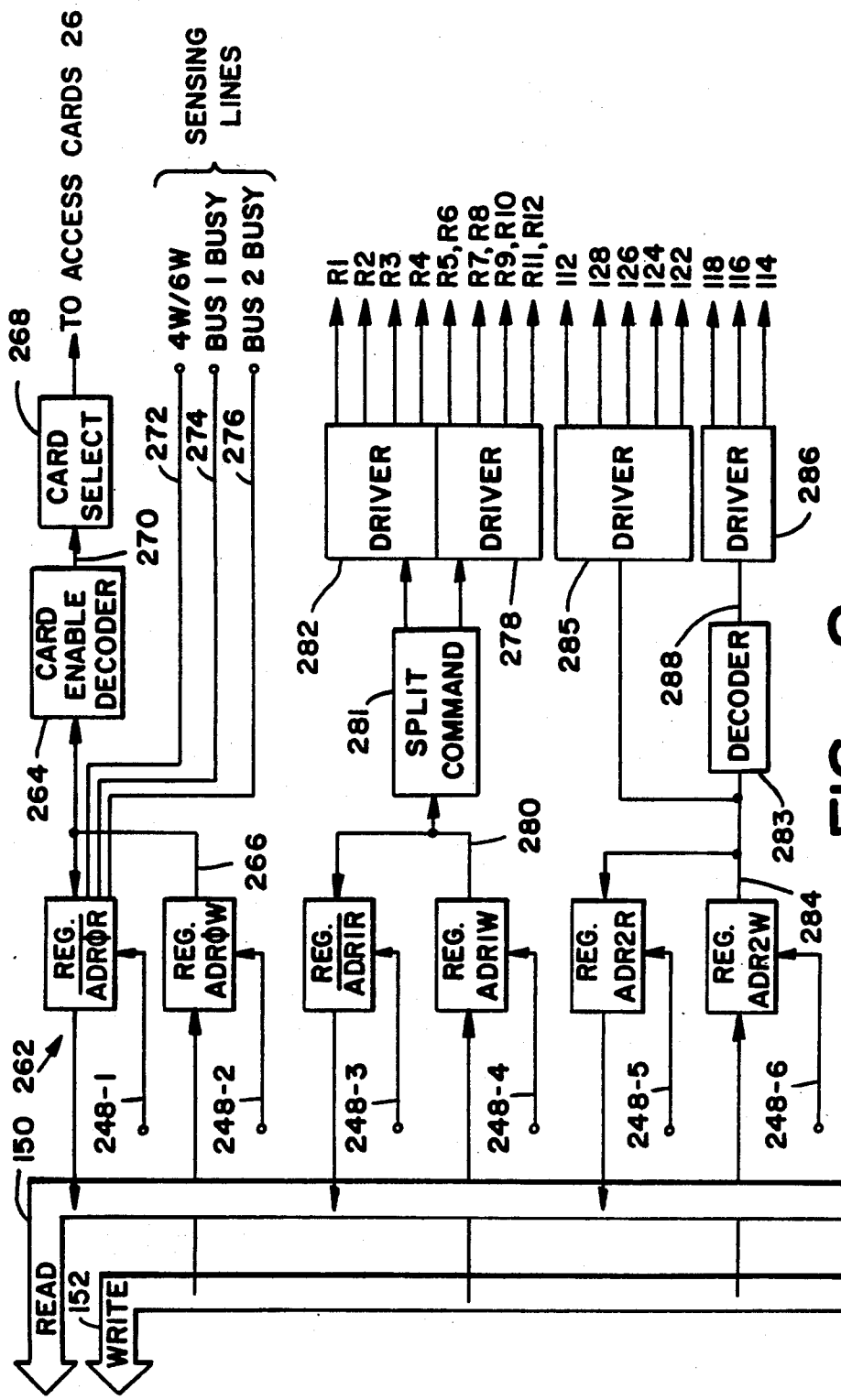
FIG_8

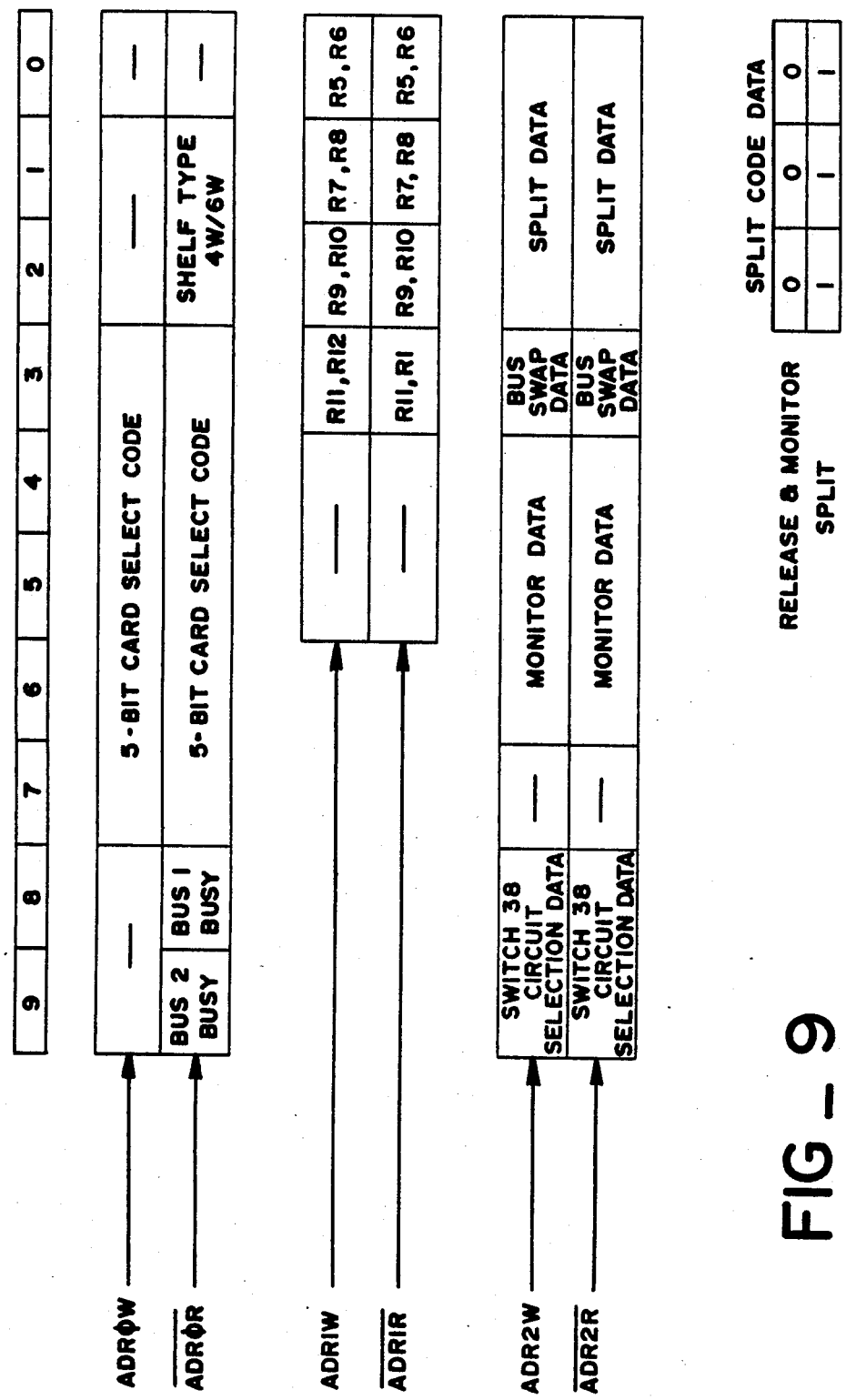
FIG_9

| DATA WRITTEN INTO REG 0: | | | | | | | CARD SLOT(S) ENABLED | |
|---|---|---|---|---|---|---|---|---|
| 0 | 0 | 0 | 0 | 0 | = | 0 | NONE | RESET |
|   |   |   | 0 | 1 | = | 1 | 1 | |
|   |   |   | 1 | 0 | = | 2 | 2 | |
|   |   |   | 1 | 1 | = | 3 | 3 | |
|   |   | 1 | 0 | 0 | = | 4 | 4 | |
|   |   |   | 0 | 1 | = | 5 | 5 | |
|   |   |   | 1 | 0 | = | 6 | 6 | FOR USE ON 4W SHELF |
|   |   |   | 1 | 1 | = | 7 | 7 | |
|   | 1 | 0 | 0 | 0 | = | 8 | 8 | |
|   |   |   | 0 | 1 | = | 9 | 9 | |
|   |   |   | 1 | 0 | = | 10 | 10 | |
|   |   |   | 1 | 1 | = | 11 | 11 | |
|   |   | 1 | 0 | 0 | = | 12 | 12 | |
|   |   |   | 0 | 1 | = | 13 | 1-3 | |
|   |   |   | 1 | 0 | = | 14 | 2-4 | |
|   |   |   | 1 | 1 | = | 15 | 5-3 | |
| 1 | 0 | 0 | 0 | 0 | = | 16 | 6-4 | FOR USE ON 6W SHELF |
|   |   |   | 0 | 1 | = | 17 | 7-9 | |
|   |   |   | 1 | 0 | = | 18 | 8-10 | |
|   |   |   | 1 | 1 | = | 19 | 11-9 | |
|   |   | 1 | 0 | 0 | = | 20 | 12-10 | |
|   |   |   | 0 | 1 | = | 21 | 1-3 | |
|   |   |   | 1 | 0 | = | 22 | 2-4 | |
|   |   |   | 1 | 1 | = | 23 | 5-7 | |
|   | 1 | 0 | 0 | 0 | = | 24 | 6-8 | |
|   |   |   | 0 | 1 | = | 25 | 9-11 | NOT CURRENTLY USED |
|   |   |   | 1 | 0 | = | 26 | 10-12 | |
|   |   |   | 1 | 1 | = | 27 | . | |
|   |   | 1 | 0 | 0 | = | 28 | . | |
|   |   |   | 0 | 1 | = | 29 | . | |
|   |   |   | 1 | 0 | = | 30 | . | |
| 1 | 1 | 1 | 1 | 1 | = | 31 | . | |

FIG _ 10

|  | R/W | A/D | MCLK | CYCLE | GO | 9 | 8 | 7 | 6 | 5 | 4 | 3 | 2 | 1 | 0 | XACK |
|---|---|---|---|---|---|---|---|---|---|---|---|---|---|---|---|---|
| STEP 1 | 1 | 1 | 1 | 1 | 1 | 1 | 1 | 1 | 1 | 1 | 1 | 1 | 1 | 1 | 1 | 1 |
| WRITE ADDRESS 2-1 | 1 | 0 | 1 | 1 | 0 | 0 | 1 | 1 | 0 | 1 | 1 | 0 | 1 | 1 | 1 | 1 |
| 2-2 | 1 | 0 | 0 | 1 | 0 | 0 | 1 | 1 | 0 | 1 | 1 | 0 | 1 | 1 | 1 | 1 |
| 2-3 | 1 | 0 | 1 | 1 | 0 | 0 | 1 | 1 | 0 | 1 | 1 | 0 | 1 | 1 | 1 | 1 |
| READ ADR. 3 | 0 | 0 | 0 | 1 | 0 | 0 | 1 | 1 | 0 | 1 | 1 | 0 | 1 | 1 | 1 | 0 |
| READ ADR. 4 | 0 | 0 | 0 | 0 | 0 | 1 | 0 | 0 | 1 | 0 | 0 | 1 | 0 | 0 | 0 | 0 |
| 5 | 1 | 1 | 1 | 1 | 0 | 1 | 1 | 1 | 1 | 1 | 1 | 1 | 1 | 1 | 1 | 1 |
| WRITE DATA 6 | 1 | 1 | 0 | 1 | 0 | – | – | 1 | 0 | 0 | 0 | 0 | – | – | 1 | 0 |
| READ DATA 7 | 0 | 1 | 0 | 1 | 0 | 0 | 0 | 1 | 0 | 0 | 0 | 0 | 0 | 0 | 1 | 0 |
| 8 | 1 | 1 | 1 | 1 | 0 | 1 | 1 | 1 | 1 | 1 | 1 | 1 | 1 | 1 | 1 | 1 |
FIG _ 11
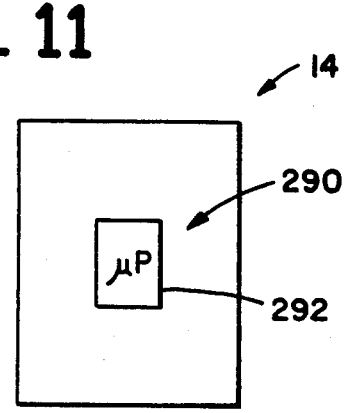
FIG _ 12
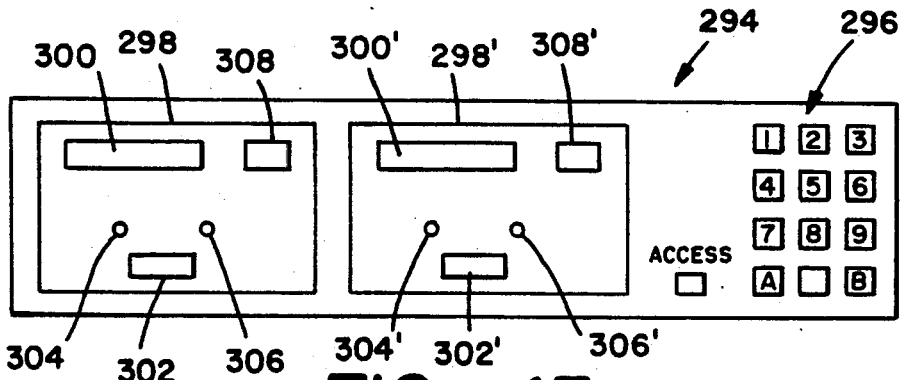
FIG _ 13

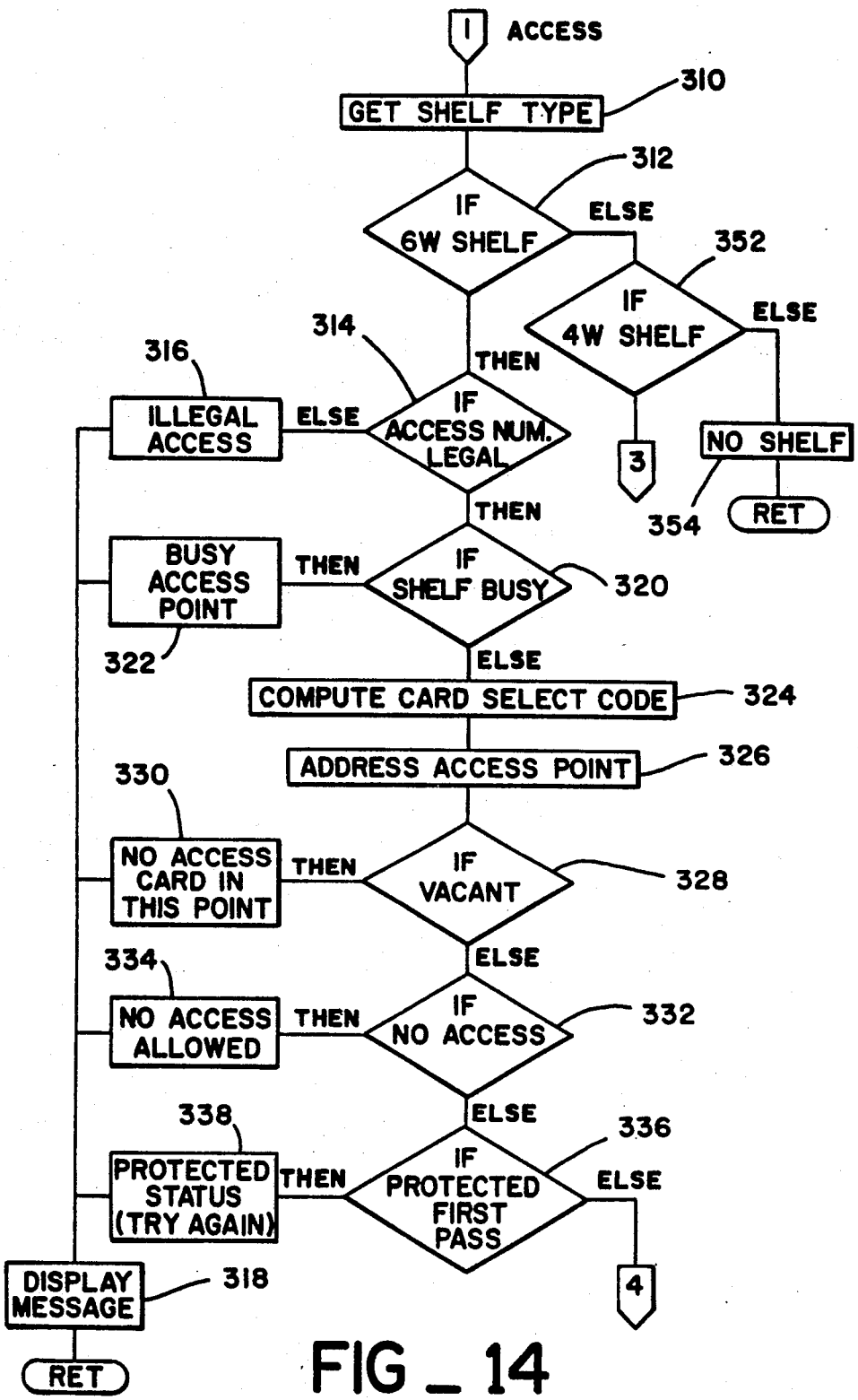
FIG _ 14

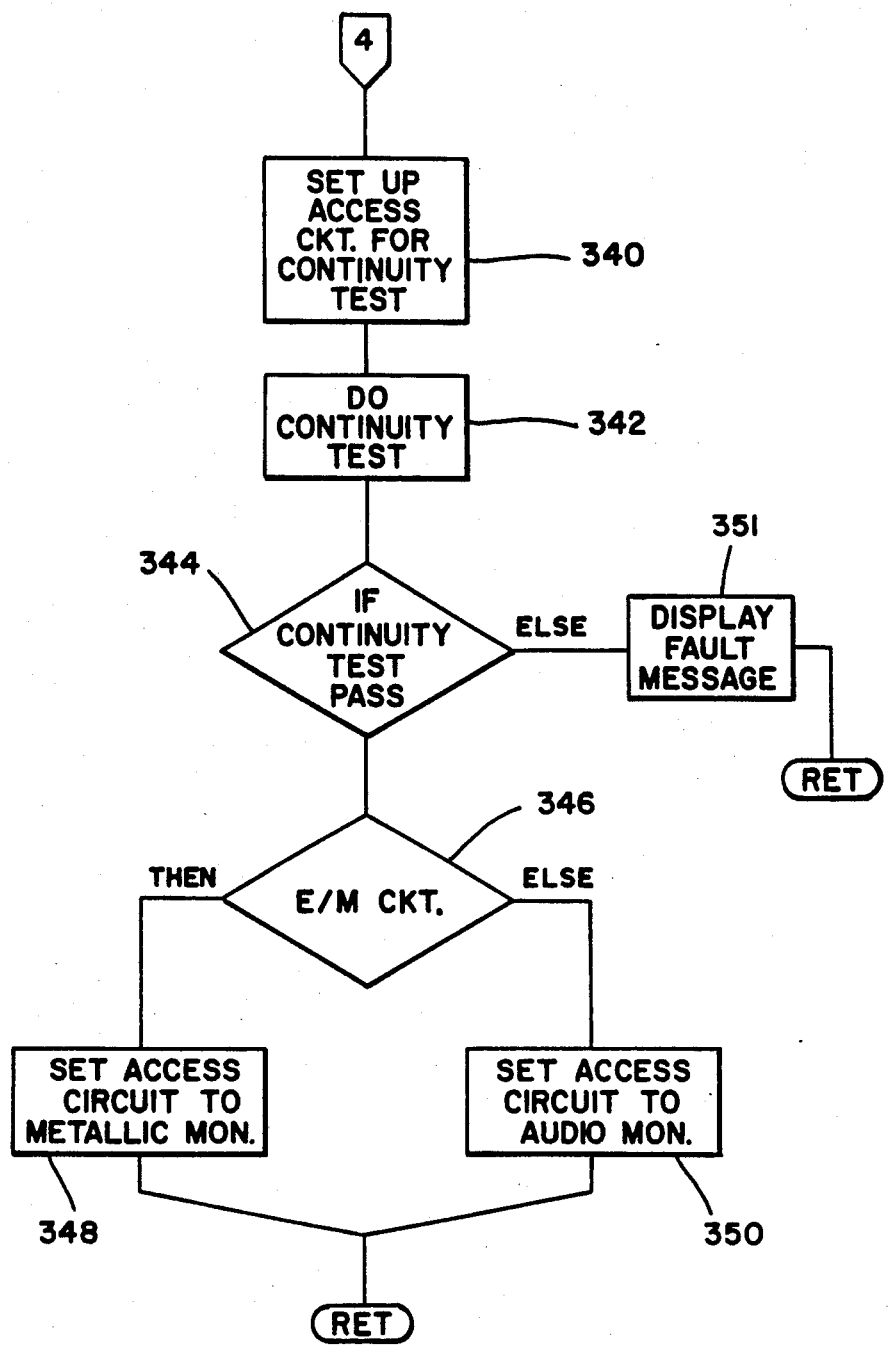
FIG_15

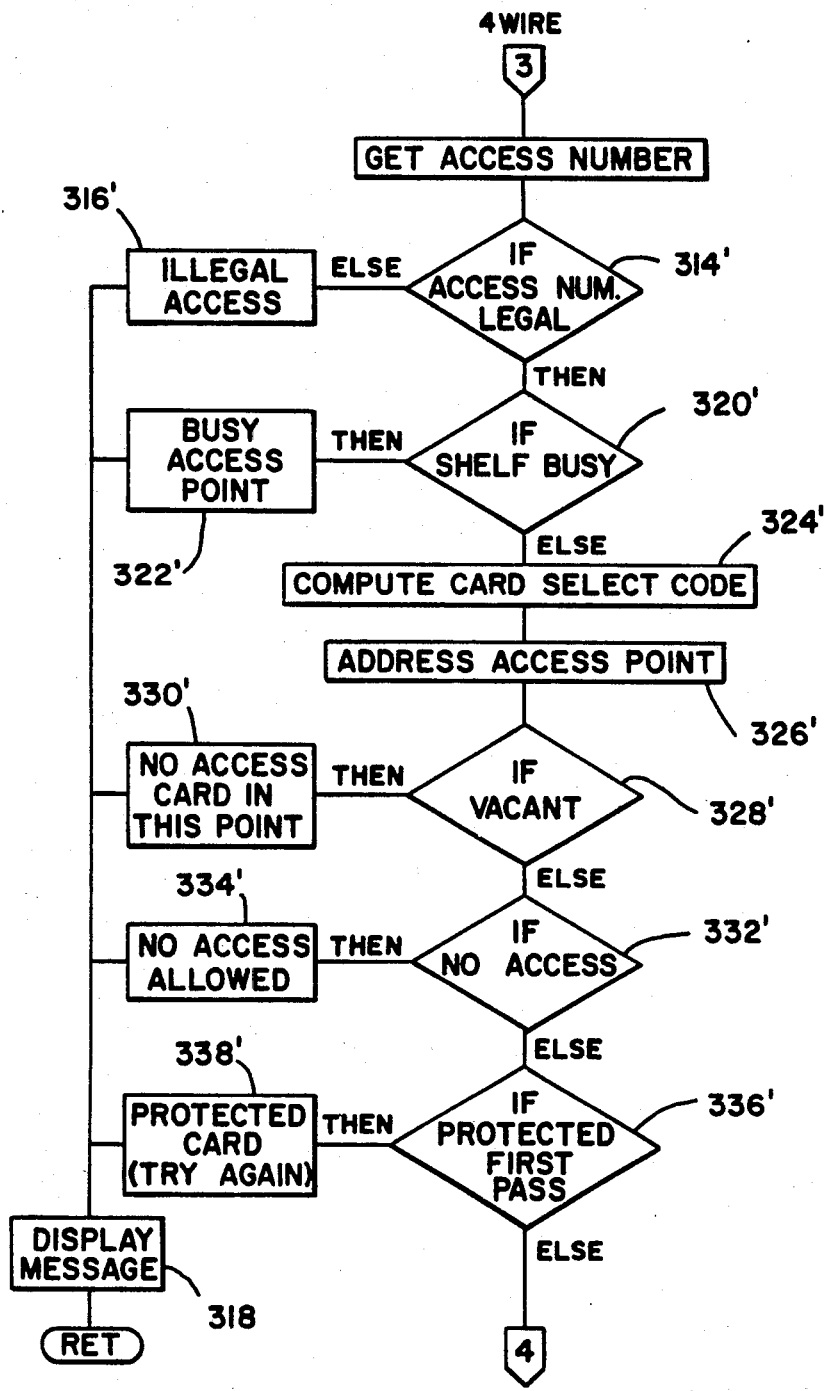
FIG _ 16

SYSTEM FOR ACCESSING ELECTRICAL CIRCUITS AND RELAY SWITCH THEREOF

This is a continuation of Ser. No. 06/447,753, filed Dec. 8, 1982, now U.S. Pat. No. 4,525,605.

DESCRIPTION

1. Technical Field

The present invention relates generally to a system for accessing electrical circuits and, more particularly, to a switching system for accessing telephone communications circuits.

2. Background Art

Systems exist for accessing electrical circuits to test the circuits for a variety of defects. For example, switching systems have been developed for use in a telephone office to access selectively telephone circuits on which quality control tests can be performed. Typically, the switching systems connect the telephone circuits to be tested to test jacks located at a jack panel or other test panel. A plurality of test panels can be located throughout the telephone office and to which the switching system can connect the telephone circuits.

In one prior switching system, a common controller is used to control various switching units in the system to connect any of the telephone circuits to any of the plurality of test panels located throughout the telephone office. The common controller constitutes a programmable microprocessor that directs, in a preprogrammed manner, all the necessary switching which is commanded from any of the test panels. The programmable microprocessor communicates with each of the test panels and switching units over a common control bus; however, the test panels and switching units do not communicate directly with each other. Rather, each communicates over the control bus with the common controller and the controller then communicates with the other after processing the data it receives.

Although the use of a switching system having a central controller is in many respects powerful and flexible, e.g., the central controller is a cost-effective shared resource, there are disadvantages. Frequently, the number of telephone circuits that need to be accessed in a given telephone office is small relative to the capacity of the switching system having the central controller. Consequently, the cost of such a switching system is high, considering the minimal control that it has to perform in a small telephone office. Also, the controller, being common to the switching system, is a focal point for failures which, if they occur, inhibit the entire system operation. The use of a redundant controller increases the cost of the switching system.

With respect to another aspect of the switching system, as is known, telephone circuits occur as two wire (2W), four wire (4W) or six wire (6W) circuits. Prior switching systems for accessing various combinations of these telephone circuits use a pair of relay switches, each having four contacts, to access three 2W or one 4W and one 2W circuit, or a relay switch having eight contacts to access four 2W or two 4W circuits. One problem is that while the pair of four contact relays can be employed to access a 6W circuit, there is an inefficient or lack of usage of two contacts. Alternatively, the eight contact relay can be used and employed to access the 6W circuit, but again an inefficient or lack of usage of two contacts exists. Also, a six contact relay switch is available to access efficiently a 6W circuit, but is inefficient to access a 4W circuit. Since an item of major expense in the switching system is a relay, and since there are numerous relays employed in any given system, such inefficient usage is costly.

Another problem relates to "hits" or circuit disturbances that are created in prior switching systems. Circuit disturbances are produced during use of the switching systems because monitor circuits, which monitor the telephone circuits being accessed, are located at the test panel and connected over long wires to the point of accessing of the telephone circuits. It is this long connection itself which results in the circuit disturbances. Circuit disturbances are also produced because pairs of telephone circuits which need not be tested are still accessed, brought to the test panel and, at the test panel, "normalled through" back to the point of accessing, but this normalling through occurs only after these pairs have been subjected to the system wiring.

The present invention is directed to overcoming the problems as set forth above.

DISCLOSURE OF THE INVENTION

In one aspect, the present invention is a system for accessing a plurality of electrical circuits, the electrical circuits including two-wire, four-wire or six-wire circuits or a combination thereof, including a common access test bus, a common control bus, a plurality of access shelf means for connecting the electrical circuits to the common access test bus, each of the access shelf means being individually selectively controllable to connect the plurality of electrical circuits to the common access test bus in response to control signals on the common control bus, andd a test controller having programmable data processing means for selectively generating the control signals to individually control any one of the plurality of access shelf means.

The test controller has its own programmable data processing means which communicates directly with each of the access shelf means via the common access test bus and the common control bus. Therefore, the test controller and, in particular, the programmable data processing means, can be sized or have a capacity that is not excessive and is in conformity with the switching capacity of the plurality of access shelf means with which it communicates. Furthermore, in the event several such systems are installed throughout a telephone office and one of the test controllers of one of the systems fails, the other systems will not fail since the other test controllers have their own data processing means to carry on the control and test functions at their test stations.

Also, monitor circuits are located at the access shelf mens and pairs of the electrical circuits not being tested are normalled through at the access shelf means, thereby preventing, or at least minimizing, the creation of circuit disturbances.

In another aspect, the present invention includes a switch for closing and splitting twelve wires which may constitute 2W, 4W and 6W circuits and combinations thereof, including first relay means, having twelve contacts corresponding to the twelve wires, respectively, for closing the twelve wires and for splitting the twelve wires into twenty-four wires; second relay means, having twelve contacts, for closing a first twelve of the twenty-four split wires, each of two of the twelve contacts of said second relay means being on two of the first twelve wires, and third relay means, having twelve contacts, for closing a second twelve of the twenty-four split wires, each of two of the twelve contacts of said third relay means being on two of the second twelve wires.

As will become more apparent, by utilizing a switch having such relay means and contacts, a 2W or 4W or 6W circuit, or any combination thereof, can be accessed without inefficient usage of contacts. Furthermore, the average number of relays that need be used for an access system of a given size is reduced over prior systems.

BRIEF DESCRIPTION OF THE DRAWINGS

FIG. 1 is a block diagram of a conventional hybrid telephone circuit used to explain nomenclature of the present invention.

FIGS. 2A and FIG. 2B are wiring diagrams also used to explain nomenclature of the present invention.

FIG. 3 is a block diagram of an embodiment of the present invention.

FIG. 4 is a block diagram of an access shelf of the present invention.

FIG. 5 is a schematic illustration of an access card of the access shelf of FIG. 4.

FIG. 6, FIG. 6A, FIG. 6B and FIG. 6C illustrate schematically a bus select card of the access shelf of FIG. 4.

FIGS. 7-8 show, schematically, a logic module card of the access shelf of FIG. 4.

FIG. 9 is a table showing register assignments of the present invention.

FIG. 10 is a table of an access card selection code.

FIG. 11 illustrates another table having computer instructions for performing the present invention.

FIG. 12 is a block diagram of the test controller of the present invention.

FIG. 13 is a diagram of the front panel of the test controller.

FIGS. 14-16 are flow charts used to explain the present invention.

DETAILED DESCRIPTION OF THE DRAWINGS

The principles of the present invention can be applied to access all types of electrical circuits for circuit testing and other purposes. One particular type of electrical circuit that can be accessed by the present invention is the telephone electrical circuit. Therefore, reference will be made to telephone electrical circuits to describe the invention.

FIG. 1, which is used to provide nomenclature for understanding the present invention, illustrates a hybrid network N commonly found in the telephone industry. Network N interfaces a bidirectional two wire (2W) telephone circuit $N_1$ leading to a telephone (not shown) with a 2W transmit telephone circuit $N_2$ and a 2W receive telephone circuit $N_3$, all of which carry, for example, voice signals. Another 2W telephone circuit $N_4$ carries control signals, commonly referred to as E/M (ear/mouth). Each respective 2W circuit $N_1-N_4$ can be considered to be a separate 2W circuit, or, as indicated, $N_2-N_3$ together can be considered to be a 4W circuit and $N_2-N_4$ together can be considered to be a 6W circuit.

FIG. 2A and FIG. 2B, which also are used to provide nomenclature for the present invention, illustrate more specifically a 2W circuit such as circuit $N_2$ which has one wire T, commonly referred to as tip, and another wire R, commonly referred to as ring. When not accessed by the present invention, as shown in FIG. 2A, wire T and wire R are closed or continuous, resulting in just two wires T,R. When accessed by the present invention, as shown in FIG. 2B, wire T and wire R are split, resulting in a total of four wires $T_1$, $T_2$, $R_1$, $R_2$. Similarly, if a 4W circuit or a 6W circuit were split, the result would be eight wires or twelve wires, respectively. Thus, when a telephone wire such as wire T is split, the result is two wires such as $T_1$, $T_2$, whereas when the wire such as wire T remains closed, the result is one wire T. The wire T, the wire R, the wire E and the wire M will be commonly referred to as a wire W.

FIG. 3 illustrates a system 10 for accessing a plurality of telephone circuits 12 which can be conventionally 2W, 4W or 6W circuits. A single test controller 14 communicates with a plurality of access shelves 16 over a common path shown generally at 18. As will be described, path 18 constitutes a common access test bus 20 and a common control bus 22 coupled to and between the plurality of access shelves 16 and the test controller 14. The plurality of access shelves 16 are controlled by test controller 14 to access or couple the telephone circuits 12 to the common access test bus 20 in response to control signals on the common control bus 22. The plurality of access shelves 16 are connectable to the common access test bus 20 in a parallel or "daisy chain" configuration so that only one of the access shelves 16 at a time is activated to make the connection between the circuits 12 and bus 20. As one example, ten access shelves 16, referenced 000-009, are in the daisy chain. And, a particular system 10 can be installed initially with fewer than ten access shelves 16, and then additional individual access shelves 16 can be added to the daisy chain as increased system capacity is needed.

As will be further described, each access shelf 16 can be installed in a 4W or 6W configuration. In the 4W configuration, the access shelf 16 can be connected, for example, to a maximum of one hundred and forty-four 4W or two hundred and eighty-eight 2W circuits 12. In the 6W configuration, each access shelf 16 can be connected, for example, to a maximum of ninety-six 6W circuits or ninety-six 4W and ninety-six 2W circuits 12.

As also shown in FIG. 3 by like reference numerals, system 10 can include another plurality of access shelves 16', e.g., ten shelves 16' numbered 010-019, which connect to a plurality of telephone communications circuits 12'. The single test controller 14 controls and connects to the plurality of access shelves 16' via a path 18' having a common access test bus 20' and common control bus 22'. For example, during installation of system 10, the plurality of access shelves 16 can be assigned to telephone circuits 12 entering the telephone switching office or building (not shown), while the plurality of access shelves 16' can be assigned to telephone circuits 12' leaving the building.

FIG. 4 shows a typical one of the plurality of access shelves 16 (or shelves 16'). Each access shelf 16 constitutes a switch 24 for connecting the 2W, 4W or 6W circuits 12 to the common access test bus 20 in response to control signals received on the common control bus 22. Physically, switch 24 has three major components including a plurality of access cards 26 which receive the circuits 12, a test bus select card 28 and a logic module card 30. For example, there are twelve access cards 26, numbered 26-1 to 26-12, one bus select card 28 and one logic module card 30.

Each access card 26, as will be described more specifically in relation to FIG. 5, has a relay switch 32 for closing and splitting a number of wires W or circuits 12. Relay switch 32 acts on any one of four groups 32-1 to 32-4, each having twelve wires W. When split, each wire W constitutes two wires, such as $T_1$, $T_2$ previously described, so that the output of any card 26 is one group of 12×2 or twenty-four wires indicated generally by a line 34 and a line 36. The other three groups 32-1 to 32-4, are not split, but remain closed or "normalled through" by relay switch 32 at the input of access shelf 16, as indicated by the legend or notes on FIG. 4. Output line 34 is common to cards 26-1, 2, 5, 6, 9 and 10, while output line 36 is common to cards 26-3, 4, 7, 8, 11 and 12.

In operation, at any one time relay switch 32 of any one of the access cards 26-1, 2, 5, 6, 9 or 10 can be activated to split and connect the twenty-four wires of one group 32-1 to 32-4 to line 34. Also, at such time, relay switch 32 of any one of the access cards 26-3, 4, 7, 8, 11 or 12 can be activated to split and connect the twenty-four wires of a group 32-1 to 32-4 to line 36. Thus, two groups of twenty-four wires can be connected through switch 26 to line 34 and line 36.

The bus select card 28 includes a ganged relay switch 38 constituting a one-of-three switch 38-1 and a one-of-three switch 38-2. Switch 38-1 connects selectively any one of three groups of eight wires of line 34, designated lines 34-1 to 34-3, to a line 40 constituting eight wires. The selected eight wires of line 40 constitute four of the twelve wires W split by a relay switch 32. The wires of the remaining unselected two groups of eight wires 34-1 to 34-3 are closed or normalled through to line 34 at the input to bus select card 28. Similarly, switch 38-2 connects selectively any one of three groups of eight wires of line 36, designated lines 36-1 to 36-3, to a line 42 constituting eight wires. The selected eight wires of line 42 constitute another four of the twelve wires W split by a relay switch 32. The wires of the remaining unselected two groups of eight wires 36-1 to 36-3 are closed or normalled through to line 36 at the input to bus select card 28.

A bus swap relay switch 44, whose significance will be discussed in more detail below, is either in the one position shown or the other position indicated by the dotted lines. In the one position, which is a non-swapping position, switch 44 connects line 40 to a line 46 constituting eight wires and line 42 to a line 48 constituting eight wires. In the other or swapping position, switch 44 connects line 40 to line 48 and line 42 to line 46.

The eight wires of line 46 are divided into four wires each shown by a line 50 and a line 52. Thus, line 50 and line 52 each constitute two of the twelve wires W split by a relay 32, i.e., a 2W circuit. A relay switch 54, when in the closed position shown, connects the four wires of line 50 to the common access test bus 20, while a relay switch 56, when in the closed position shown, connects the four wires of line 52 to the common access test bus 20. When switch 54 is opened or in the off position and/or switch 56 is opened or in the off position, the corresponding wires of line 50 and line 52 are closed or normalled through to line 46, as indicated on FIG. 4. Thus, a pair of 2W circuits or one 4W circuit can be connected to common access test bus 20 via switch 54 and switch 56.

The eight wires of line 48 are divided into four wires each shown by a line 58 and a line 60. Thus, line 58 and line 60 each constitute a 2W circuit. A relay switch 62 can connect selectively none or one of the 2W circuits of line 58 or line 60 to the common access test bus 20, as indicated by the possible positions of switch 62. The unselected 2W circuits are closed or normalled through to line 48, as indicated in FIG. 4.

Overall, therefore, switch 38, switch 54, switch 56 and switch 62, depending on their various open-closed or position states, can connect selectively a 2W or a 4W or a 6W telephone circuit, or combinations thereof, at the input of bus select card 28, to the common access test bus 20, with the wires W of the remaining or unselected circuits being normalled through at the access shelf means 16 near the telephone circuits 12. Also, the reason for the bus swap switch 44 is that in its specific implementation, any 2W circuit that constitutes the E/M pair of wires W is dedicated to line 58 or line 60 for ultimate connection to bus 20. Therefore, should such an E/M pair be a part of line 40, this pair should be swapped to appear on line 48 and, ultimately, line 58 or line 60.

In general, therefore, access switch 24 includes one access means, such as access card 26-1, for splitting a first group of N wires, e.g. 12 wires, into 2N wires, e.g. 24 wires on line 34, constituting combinations o subsets of p, for example 2W, and q, for example 4W, wires contained in N. Access switch 24 includes another access means, such as access card 26-3, for splitting a second group of M wires, e.g., 12 wires, into 2M wires, e.g. 24 wires on line 36, constituting combinations of subsets s, for example 2W, and t, for example 4W, wires contained in M. Furthermore, access switch 24 has the bus select means or card 28 for connecting combinations of p, q, s and t onto bus 20 via line 50, line 52, line 58 and line 60 and normalling through the remaining combinations.

Also on bus select card 28 are a high-impedance amplifier monitor 64 associated with line 50, a high-impedance amplifier monitor 66 associated with line 52 and a high-impedance amplifier monitor 68 associated with either line 58 or line 60, as shown, depending on the position of switch 62, which are at the point of accessing telephone circuits 12. The purpose of these monitors will be discussed below.

The logic module card 30, as indicated by the listing shown in FIG. 4, has various circuit components to perform a number of functions. These include decoding a unique address to a particular one of the plurality of access shelves 16, driving relays of the various switches of the access cards 26 and bus select card 28, bus transceiving between the plurality of access shelves 16 and test controller 14, detecting when an access shelf 16 is busy or partially busy, as will be further described, which occurs when it is correctly addressed, and producing a power supply of +5 V for the circuit components. All of these functions will be more fully described in connection with FIGS. 7–8.

FIG. 5 illustrates schematically a typical one of the access cards 26, e.g., card 26-1, having the relay switch 32. At the input of card 26-1 are the four groups of wires corresponding, respectively, to line 32-1 to line 32-4. The output of switch 32 includes the twenty-four wires corresponding to line 34 of FIG. 4.

Each group 32-1 to 32-4, such as group 32-1, has twelve wires W, numbered $W_1$-$W_{12}$, which are brought into and taken out of an access card 26, to become split into two wires or remain closed or normalled through as one wire, as will become apparent. These twelve wires $W_1$-$W_{12}$ can constitute six 2W circuits or three 4W circuits.

Reference should be made to the legend in FIG. 5 showing the indentification of a normally open relay and a normally closed relay. Switch 32 includes twelve separate relays R having a coil $R_1$–$R_{12}$, respectively. Each relay coil $R_1$–$R_4$ is coupled between a line 68, to which ground potential can be applied, and respective lines 72, 74, 76 and 78 to which −48 V can be selectively applied. Thus, whenever ground potential is applied to line 68 and −48 V is applied to a respective line 72–78, the corresponding relay coil $R_1$–$R_4$ is energized.

Pairs of parallel relay coils $R_5$, $R_6$ and $R_7$, $R_8$ and $R_9$, $R_{10}$ and $R_{11}$, $R_{12}$ are connected between line 68 and respective lines 80–86 to which −48 V can also be selectively applied. Whenever ground potential is applied to line 68 and −48 V is applied to respective lines 80–86, the corresponding pair of parallel relay coils $R_5$, $R_6$ or $R_7$, $R_8$ or $R_9$, $R_{10}$ or $R_{11}$, $R_{12}$ is energized. Ground potential on line 68 is applied uniquely to each access card 26, while −48 V is applied in parallel on a selected line 72–86 to all the access cards 26 of an access shelf 16. Thus, for example, while −48 V is applied to all the lines 72, 80 of all the access cards 26, ground potential may be applied to line 68 of only one access card 26 to energize relay coils $R_1$, $R_5$, $R_6$.

Also shown in FIG. 5 are the plurality of contacts that are controlled by the energization and deenergization of relay coils $R_1$–$R_{12}$. With respect to group 32-1, relay coil $R_1$ controls twelve normally closed contacts $R_{1-1}$ to $R_{1-12}$, relay coil $R_5$ controls twelve normally open contacts $R_{5-1}$ to $R_{5-12}$ and coil $R_6$ controls twelve normally open contacts $R_{6-1}$ to $R_{6-12}$. Each normally closed contact $R_{1-1}$–$R_{1-12}$ is connected across the two wires of $W_1$–$W_{12}$, respectively, which are brought into and taken out of an access card 26. When each contact $R_{1-1}$–$R_{1-12}$ is closed, such two wires are connected, thereby constituting one wire W. When each contact $R_{1-1}$–$R_{1-12}$ is opened, the corresponding wire W is split or interrupted, thereby forming two separate wires.

Pairs of contacts controlled by relay coil $R_5$, such as contacts $R_{5-1}$, $R_{5-2}$, are connected on opposite sides of a corresponding contact controlled by relay coil $R_1$, such as contact $R_{1-1}$, and to the split wires. When relay coil $R_5$ is energized, contacts such as contacts $R_{5-1}$, $R_{5-2}$ are closed to connect through the split wires to line 34. Similarly, pairs of contacts controlled by relay coil $R_6$, such as contacts $R_{6-11}$, $R_{6-12}$, are connected on opposite sides of a corresponding contact controlled by relay coil $R_1$, such as contact $R_{1-12}$. When relay coil $R_6$ is energized, contacts such as $R_{6-11}$, $R_{6-12}$, are closed to connect through the split wires to line 34.

A similar relay connection is made with respect to group 32-2 and the contacts of relay coils $R_2$, $R_7$, $R_8$, and with respect to group 32-3 and the contacts of relay coils $R_3$, $R_9$, $R_{10}$ and with respect to group 32-4 and the contacts of relay coils $R_4$, $R_{11}$, $R_{12}$. Therefore, to connect or split the twelve wires $W_1$–$W_{12}$ of groups 32-1 to 32-4 to output line 34, relay coils $R_1$, $R_5$, $R_6$ or relay coils $R_2$, $R_7$, $R_8$ or relay coils $R_3$, $R_9$, $R_{10}$ or relay coils $R_4$, $R_{11}$, $R_{12}$ are energized, respectively.

As shown in FIG. 5, each access card 26 has a buffer 96 that is enabled by the output of a voltage level converter 98 on a line 100, with the input to converter 98 being on line 68. Buffer 96 has an input line 102 on which a busy signal is generated whenever the particular access card 26 is activated to perform the above-mentioned switching functions and an output line 104 which couples the busy signal to the control bus 22. For reasons which will be described, when one of the access cards 26 of the group 26-1,2,5,6,9,10 is activated the busy signal is termed a busy 1 signal and when one of the access cards 26 of the group 26-3,4,7,8,11,12 is activated, the busy signal is termed a busy 2 signal.

Also, each access card 26 can be connected to three types of telephone circuits 12 identified conventionally as normal, protected and secure. Unlimited access may be made to normal circuits, restricted access may be made to protected circuits and no access may be made to secure circuits. To identify the circuits, each access card 26 has a three-position switch 106 connected as an input via a line 108 to buffer 96. The output of buffer 106 is a 2-bit code on a line 110 coupled to the control bus 22 and identifying any one of the three positions of switch 106. On installation of the system 10, the position of each switch 106 is preset to identify via the 2-bit code on line 110 the particular circuits 12 to which connection is made.

FIG. 6, FIG. 6A, FIG. 6B and FIG. 6C illustrate the bus select card 28, in which the identification of open and closed relays is similar to that used for FIG. 5. Bus select card 28 includes a plurality of relays referenced by the general symbol K (FIG. 6C). There are fourteen relay coils $K_1$–$K_{14}$ which control their respective contacts shown within the various dotted blocks (FIG. 6A and FIG. 6B). Thus, for example, a relay coil $K_1$ controls a group of four normally closed contacts $K_{1-1}$ to $K_{1-4}$ and a group of four normally closed contacts $K_{1-5}$ to $K_{1-8}$. As another example, a relay coil $K_6$ controls six normally open contacts $K_{6-1}$ to $K_{6-6}$ shown in one dotted block and ten normally closed contacts $K_{6-7}$ to $K_{6-16}$ shown over two dotted blocks.

FIG. 6A shows the twenty-four wires of line 34 divided into the three groups 34-1 to 34-3 of eight wires each and the twenty-four wires of line 36 divided into the three groups 36-1 to 36-3 of eight wires each, these groups being inputted to the bus select card 28 as was described in connection with FIG. 4. Relay coils $K_1$, $K_2$ and $K_3$ have normally closed relay contacts such as contact $K_{1-1}$ to close or normal through a wire W comprising two wires that had been split by a relay R as previously described. When relay coils $K_1$, $K_2$, $K_3$ are energized, the two wires are split and continue through to switch 38 (FIG. 6A).

As previously described, switch 38 includes a switch 38-1 and a switch 38-2, each of which selects one of the three groups of eight wires 34-1 to 34-3 or 36-1 to 36-3. This selection is accomplished using four relay coils $K_4$–$K_7$ and their normally closed or normally open contacts, as shown. Thus, depending on the energization and deenergization of relay coils $K_1$–$K_7$, there are eight wires constituting line 40 and eight wires constituting line 42 at the outputs of switch 38-1 and switch 38-2, respectively.

To energize relay coils $K_1$–$K_3$ (FIG. 6C), relay coil $K_1$ is coupled between a line 112 to which −48 V can be applied and a line 114 to which ground potential can be applied. Relay coil $K_2$ is coupled between a line 116 to which ground potential can be applied and to line 112, while relay coil $K_3$ is coupled between a line 118 to which ground potential can be applied and line 112. Relay coil $K_1$ or $K_2$ or $K_3$ can thus be energized to split the corresponding wires connected by their corresponding contacts such as $K_{1-1}$, with the remaining wires continuing to be closed or normalled through.

Relay coils $K_4$ and $K_5$ are connected in parallel between a line 120 to which −48 V can be applied and line 114. Consequently, relay coils $K_1$, $K_4$ and $K_5$ can be energized with the other relay coils $K_2$, $K_3$, $K_6$, $K_7$ being deenergized. The result is that one group of eight wires from switch 38-2, i.e., group 36-1, is connected to output line 42 and one group of eight wires from switch 38-1, i.e., group 34-1, is connected to output line 40.

Relay coil $K_2$ is not associated with the other relay coils $K_1$, $K_3$-$K_7$. Therefore, when relay coil $K_2$ is energized, with such other coils being deenergized, the second group 34-2 of eight wires is connected to line 40 and the second group 36-2 of eight wires is connected to line 42.

Relay coils $K_6$ and $K_7$ are connected in parallel between the line 118 and the line 120. Thus, relay coils $K_3$, $K_6$, $K_7$ can be energized with the other relay coils $K_1$, $K_2$, $K_4$, $K_5$ remaining deenergized. The result is that the third group 34-3 of eight wires is selected and connected to line 40 while the third group 36-3 of eight wires is selected and connected to line 42.

The bus swap switch 44 constitutes relay coils $K_8$ and $K_9$ (FIG. 6C) having their respective normally open and normally closed contacts, as shown (FIG. 6B). Relay coils $K_8$ and $K_9$ are connected in parallel between a bus swap line 122 to which ground potential can be applied and line 120. As can be seen, when relay coils $K_8$ and $K_9$ are deenergized, the eight wires of line 40 are connected to line 46 and the eight wires of line 42 are connected to line 48. When relay coils $K_8$, $K_9$ are energized, the eight wires of line 40 are connected to line 48 and the eight wires of line 42 are connected to line 46.

FIG. 6B shows the eight wires of line 48 divided into a group of four wires of line 58 and a group of four wires of line 60. As previously described in connection with FIG. 4, either the four wires of line 58 are closed or normalled through or the other four wires of line 60 are normalled through. The group of four wires of line 58 or line 60 not normalled through are split and connected to common access test bus 20. These functions are performed by relay coils $K_{10}$, $K_{11}$ (FIG. 6C), and their respective contacts (FIG. 6B, together with a relay coil $K_{12}$ and its respective contacts, which together constitute the relay switch 62 of FIG. 4.

Relay coil $K_{12}$ is connected between a line 124 to which ground potential can be applied and line 120. Relay coil $K_{12}$ not only has four normally open contacts connected to the four wires of line 58 and four normally closed contacts connected to the four wires of line 60, but also, as shown in FIG. 6C, a normally open contact connected in circuit with relay coil $K_{10}$ and a normally closed contact connected in circuit with relay coil $K_{11}$ to control the energization of the latter two, which cannot be energized at the same time. Relay coil $K_{10}$ and relay coil $K_{11}$ are connected in parallel between a line 126 to which ground potential can be applied and a line 128 to which $-48$ V can be applied.

In operation, with relay coil $K_{12}$ deenergized, relay coil $K_{11}$ can be energized, whereby the four wires of line 60 are split and connected to the common access test bus 20. With relay coil $K_{12}$ energized, relay coil $K_{10}$ can be energized, whereby the four wires of line 58 are split and connected to the common access test bus 20. If none of the coils $K_{10}$, $K_{11}$, $K_{12}$ is energized, all the wires of lines 58,60 are normalled through.

FIG. 6B also shows the eight wires of line 46 divided into a group of four wires of line 50 and a group of four wires of line 52. As described in connection with FIG. 4, neither, or one or both groups of four wires can be normalled through or can be split and connected to the common access test bus 20. This is accomplished using relay coils $K_{13}$ and $K_{14}$ (FIG. 6C) and their respective normally closed contacts constituting switch 54 and switch 56, respectively. Relay coil $K_{13}$ is connected between a line 130 to which ground potential can be applied and line 128, while relay coil $K_{14}$ is connected between a line 132 to which ground potential can be applied and line 128. When neither relay coil $K_{13}$ nor $K_{14}$ is energized, the eight wires of line 46 are normalled through. When one or both relay coils $K_{13}$, $K_{14}$ are energized, the corresponding four or eight wires are split and connected to common access test bus 20.

Also shown schematically are monitor 64, monitor 66 and monitor 68. These monitors can be coupled to line 50, line 52 and the output of switch 62, respectively, via a plurality of relays (not shown) similar to relays K. These relays (not shown) can be controlled in a similar manner as the relays K to enable monitoring of the accessed telephone circuits 12, for reasons as will be further described.

FIG. 6A also shows normally closed and normally open contacts of relay coil $K_9$ connected between a pair of shelf busy lines $L_1$, $L_2$ and a pair of daisy chain bus busy lines $L_3$, $L_4$ which carry the busy 1 and busy 2 signals. Line $L_1$ carries the busy 1 signal when any one of the cards 26 connected to line 34 is active, while line $L_2$ carries the busy 2 signal when any one of the cards 26 connected to line 36 is active. This was previously indicated in connection with line 104 of FIG. 5. With relay coil $K_9$ deenergized, which is the bus non-swap condition, line $L_1$ is coupled to line $L_4$ and line $L_2$ is connected to line $L_3$. With relay coil $K_9$ energized, which is the bus swap condition, line $L_1$ is connected to line $L_3$ and line $L_2$ is connected to line $L_4$.

FIG. 6C also shows a two-position shelf-type switch 133 which is connected to the common control bus 22. The position of this switch 133 is set on installation of system 10 and provides data indicating the configuration, i.e., 4W or 6W, of the access shelf 16, as previously mentioned. For example, when switch 133 is closed, a logic 0 is on the control bus 22 to identify a 4W configuration, and when opened a logic 1 is on bus 22 to identify a 6W configuration.

FIG. 7 illustrates schematically one part of the logic module card 30 for controlling one of the access shelves 16 in response to signals received over the common control bus 22 from test controller 14. These signals are identified as address/data (A/D0-A/D9), address/data select ($\overline{A/D}$), read/write ($\overline{R/W}$), master clock ($\overline{MCLK}$), transfer acknowledge ($\overline{XACK}$), $\overline{Go}$, and CYCLE. Bus 22, therefore, has a total of sixteen lines in which ten are for A/D0-A/D9 and six are for the other six signals, respectively.

A/D0-A/D9 are either addresses or data which are multiplexed over ten bidirectional lines 134 of bus 22. $\overline{A/D}$, which is on a line 136, indicates that A/D0-A/D9 is an address when line 136 is low and that A/D0-A/D9 are data when line 136 is high. When $\overline{R/W}$ on a line 138 is low, A/D0-A/D9 is to be read by test controller 14 and when $\overline{R/W}$ is high, A/D0-A/D9 is being written by test controller 14. A high-to-low transition of $\overline{MCLK}$ on a line 140 indicates that the information on all other lines of logic module card 30 is valid and will be held stable for the low duration of $\overline{MCLK}$, except when $\overline{Go}$ is high. A low-to-high transition of $\overline{MCLK}$ indicates that such information may be removed from such other lines.

$\overline{Go}$, which is a system failsafe signal, is on a line 142. When $\overline{Go}$ is low, the test controller 14 is working, but when high, all access shelves 16 are to ignore all further commands from test controller 14. A high-to-low transition of $\overline{XACK}$ on a line 144 indicates that A/D-0-A/D9 has been placed or received on line 134, as requested by test controller 14. A low-to-high transition of $\overline{XACK}$ signifies inactivity. A low CYCLE on a line 146 indicates that test controller 14 is executing a normal cycle, whereas a high CYCLE represents that the controller 14 is performing an extra cycle and is to be interpreted accordingly.

A bus transceiver 148, which inverts signals, provides an interface between line 134 of bus 22 carrying A/D-0-A/D9 and an internal read bus 150 and internal write bus 152 carrying A/D0-A/D9. A bus transceiver 154, which also inverts signals, couples $\overline{R}/W$ on line 138 to a line 156 as R/$\overline{W}$, $\overline{A}/D$ on line 136 to a line 158 as A/$\overline{D}$, $\overline{MCLK}$ on line 140 to a line 160 as MCLK and CYCLE on line 146 to a line 162 as $\overline{CYCLE}$. A bus transceiver 164, which also inverts signals, couples $\overline{GO}$ on line 142 to a line 166 as GO and outputs $\overline{XACK}$ on line 144 from a line 168 carrying XACK.

An address decoder 170 is preset with an 8-bit address that is unique to one access shelf 16 of the plurality of access shelves 16. Address decoder 170 receives A/D-2-A/D9 over a line 172 from internal write bus 152 and produces a logic 1 on an output line 174 whenever the received address A/D2-A/D9 matches the preset address A/D2-A/D9. An address latch 176, when clocked by a clock signal on a line 178, latches the logic 1 on line 174, together with A/D0-A/D1 on line 180 and line 182, respectively, from internal write bus 152.

Address decoder 170 produces on a line 184 the preset address A/D2-A/D9 which is inputted to an address read-back buffer 186 and a complementary $\overline{ad}$ $\overline{dress}$ read-back buffer 188. Address latch 176 outputs the latched A/D0-A/D1 from line 180 and line 182 onto a line 190 and a line 192, respectively, which are inputted to address read-back buffer 186 and $\overline{address}$ read-back buffer 188. Address latch 176 also produces a logic 1 on an output line 194 and a logic 0 on an output line 196 in response to the logic 1 on line 174. Address read-back buffer 186 and $\overline{address}$ read-back buffer 188 are enabled alternately by a logic 1 on a line 198 and a logic 1 on a line 200 to put A/D0-A/D9 and A/D-0-A/D9 on read bus 150.

To clock address latch 176, clock input line 178 is connected to the output of an AND gate 202 whose one input is connected to line 158 carrying A/$\overline{D}$ and whose other input is connected to the output of an AND gate 204 over a line 206. One input to gate 204 is MCLK on line 160 and the other input is connected to a line 208. an inverter 210 produces $\overline{R}/W$ on line 208 in response to R/$\overline{W}$ on line 156.

Gate 204 is enabled to produce a logic 1 on line 206 when MCLK is on line 160 and $\overline{R}/W$ is on line 208. Then, with A/$\overline{D}$ on line 158 high, gate 202 is enabled to produce the clock signal on line 178.

To place alternately the read-back address from buffer 186 and read-back address from buffer 188 onto read bus 150, an AND gate 212 has one input connected to line 194 and another input connected to line 156. An AND gate 214 has one input connected to the output of gate 212 over a line 216 and another input connected to line 158. The output of gate 214 is produced on a line 218 as one input to a NAND gate 220 whose other input is connected to line 162 carrying $\overline{CYCLE}$. Gate 220 has its output connected to line 198. An inverter 222 has its input connected to line 162 and its output connected over a line 224 as one input to a NAND gate 226. Gate 226 has another input connected to line 218 and its output coupled to line 200.

In operation, gate 212 is enabled to produce a logic 1 on line 216 during a read mode when R/$\overline{W}$ on line 156 is high and latch 176 has produced the logic 1 on line 194. Gate 214 is then enabled to produce a logic 1 on line 218 in response to the logic 1 on line 216 and A/$\overline{D}$ on line 158 being high, which thus enables gate 220 and gate 226. Thereafter, on alternate cycles when line 162 carrying $\overline{CYCLE}$ switches between high and low, gate 220 and gate 226 connected to inverter 222 alternately output a logic 1 on line 198 and line 200 to enable address read-back buffer 186 and $\overline{address}$ read-back buffer 188. Consequently, A/D0-A/D9 and A/D0-A/D9 are placed alternately on internal read bus 150.

An AND gate 228, whose output carries XACK on line 168, has one input connected to line 194 and another input connected to line 160. Gate 228 produces XACK on line 168 to acknowledge receiving the address A/D0-A/D9 by module card 30 on line 134.

The direction of bus transceiver 148 is controlled by the signal on line 196 and the output of an inverter 230 over a line 232. The input to inverter 230 is coupled to the output of an AND gate 234 over a line 236, whose two inputs are connected to line 156 and line 160. Bus transceiver 148 directs A/D0-A/D9 and A/D0-A/D9 from internal read bus 150 onto line 134 when both line 196 and line 232 are low, and directs A/D0-A/D9 onto internal write bus 152 when either line 196 or line 232 is high.

In the overall operation of logic module card 30 described thus far, assume that test controller 14 has placed a specific address A/D0-A/D9 onto line 134 of common control bus 22. This specific address A/D-0-A/D9 is received by each of the plurality of access shelves 16 in the daisy chain shown in FIG. 3 and placed by the respective bus transceivers 148 on the respective internal write buses 152. However, only one access shelf 16 has a preset address in its address decoder 170 corresponding to the specific address A/D-2-A/D9 on internal write bus 152. That address decoder 170 then produces the logic 1 on line 174 which is then clocked into address latch 176, together with A/D0-A/D1, at the time of the clock signal on line 178. Then, the logic 1 on line 194 from address latch 176 and MCLK on line 160 enable gate 228 to produce XACK on line 168, thereby acknowledging to test controller 14 via bus transceiver 164 and $\overline{XACK}$ on line 144 of common control bus 22 that the address A/D0-A/D9 has been received.

Then, to verify that the correct access shelf 16 has been activated via address decoder 170, test controller 14 instructs the access shelf 16 to send back the address A/D0-A/D9. To accomplish this, $\overline{R}/W$ on line 138 is set low so that R/$\overline{W}$ on line 156 is high. When MCLK on line 160 is high, AND gate 234 is enabled to produce the logic 1 on line 236 that is inverted to a logic 0 on line 232 by inverter 230. With line 196 being low, bus transceiver 148 is enabled to transfer address information from internal read bus 150 to line 134.

Next, on alternate cycles in response to the alternate enabling signal on line 198 and line 200, address read-back buffer 186 and $\overline{address}$ read-back buffer 188 place A/D0-A/D9 and A/D0-A/D9 on internal read bus 150. Since A/D2-A/D9 and A/D2-A/D9 from buffer 186 and buffer 188, respectively, correspond to the preset address in address decoder 170, these can be compared by test controller 14 to the specific address A/D2-A/D9 previously sent on common control bus 22 to verify that the correct access shelf 16 has been addressed. The purpose of using a complementary readback address from buffer 188 in addition to the uncomplemented read-back address from buffer 186 is to detect a condition in which, for example, one of the bus lines 134 may be shorted or stuck at one logic level.

FIG. 7 also shows a register enable selector 238 which is used to select one of six data registers to be described in connection with FIG. 8, three being read registers identified as ADR0R, ADR1R and ADR2R, and three being write registers identified as ADR0W, ADR1W and ADR2W. Register enable selector 238 selects a particular data register in dependence on A/D-0–A/D1 and whether test controller 14 is reading or writing data. Therefore, register enable selector 238 is connected to line 190 and line 192 to receive A/D-0–A/D1 from address latch 176. Selector 238 also has an input connected to line 196, an input connected to line 158 carrying A/$\overline{\text{D}}$ and an input connected to line 208 carrying $\overline{\text{R}}$/W. Another input of selector 238 is coupled over a line 240 to the output of a NAND gate 242. One input to gate 242 is connected to line 208 while the other input is connected to an inverter 244 via a line 246, the input to inverter 244 being on line 160.

Register enable selector 238 is enabled when line 196 is low and when A/$\overline{\text{D}}$ on line 158 is low, corresponding to the data mode. Selector 238 also is enabled via AND gate 242 when MCLK on line 160 is high and R/$\overline{\text{W}}$ on line 156 is low for the write mode. In response to all the inputs, selector 238 will then select, via one of six output lines 248-1 to 248-6, one of the three write registers ADR0W, ADR1W, ADR2W to write data via internal write bus 152. If test controller 14 is reading a register ADR0R, ADR1R, ADR2R, the corresponding data will be sent over internal read bus 150 without waiting for MCLK.

An AND gate 250 produces a signal $\overline{\text{RESET}}$ on an output line 252 to reset address latch 176 and the read and write registers of FIG. 8 under certain conditions. Gate 250 has one input connected over a line 254 to a power-up reset 256 which is connected to a +5 V power supply 258. Another input of gate 250 is connected over a line 258 to the output of a delay 260 which delays GO on line 166.

Two conditions can occur for generating $\overline{\text{RESET}}$. First, power-up reset 256, on power-up, disables gate 250 for about one second to produce $\overline{\text{RESET}}$ on line 252, thereby clearing address latch 176. Second, test controller 14 normally holds line 142 low, i.e., $\overline{\text{GO}}$. However, if line 142 is high for more than, for example, 250 msec., then $\overline{\text{RESET}}$ on line 252 is produced. The 250 msec. delay is provided by delay 260 which delays and inverts GO on line 166 to disable gate 250 and produce $\overline{\text{RESET}}$ on line 252. This latter reset condition acts as a failsafe feature by producing $\overline{\text{RESET}}$ if, for example, test controller 14 fails or is powered down. The 250 msec. delay provides immunity to noise spikes on line 142 which might otherwise inadvertently cause $\overline{\text{RESET}}$ if a circuit access is in progress.

With reference to FIG. 8, test controller 14 communicates with a plurality of registers 262 over read bus 150 and write bus 152. These registers 262 include the read register ADR0R and write register ADR0W, the read register ADR1R and write register ADR1W, and the read register ADR2R and write register ADR2W. Each register is enabled as selected by selector 238 over respective lines 248-1 to 248-6.

FIG. 9 is a table indicating the register assignments or data that are stored in the plurality of registers 262 relative to bus lines A/D0–A/D9. Written into write register ADR0W over bus 152 is a 5-bit code for selecting particular access cards 26. A card enable decoder 264 shown in FIG. 8 decodes the 5-bit code which is received from write register ADR0W via a line 266. Decoder 264 activates an access card selector 268 via a line 270 to select the access cards 26 defined by the 5-bit code, as will be now further described.

An access shelf 16 can be configured for 4W or 6W accesses, as previously mentioned in connection with the 4W/6W shelf-type switch 133 shown in FIG. 6C. Also, as previously mentioned, there are, for example, a total of twelve access cards 26-1 to 26-12 on each shelf 16. If configured as a 4W shelf 16, then the 5-bit code of register ADR0W identifies any one of the twelve cards 26-1 to 26-12, but if configured as a 6W shelf 16, the 5-bit code identifies pairs of cards 26. FIG. 10 is a table showing this card selection code.

Read register ADR0R stores the shelf type data indicating whether the particular shelf 16 is configured as a 4W or 6W shelf, bus 1 busy data and bus 2 busy data indicating whether these buses are busy or idle and the 5-bit code written into write register ADR0W. The shelf type data are received over a 4W/6W sensing line 272 which senses the position of the 4W/6W shelf-type switch 133 and the busy 1 data and busy 2 data are received over a sensing line 274 and a sensing line 276 coupled to control bus 22, which sense whether control lines of the control bus 22 are busy. The 5-bit code of write register ADR0W is latched into read register ADR0R over line 266. In a read mode, i.e., $\overline{\text{R}}$/W being low, the data in register ADR0R are read by test controller 14 over read bus 150. The 5-bit code is read to verify that the proper code has been written, and the other data of register ADR0R are read for control purposes, as will be further described.

Written into write register ADR1W are data, as shown in FIG. 9, for controlling the energization of relays $R_5$–$R_{12}$. A driver 278 of FIG. 8 responds to this data stored in register ADR1W via a line 280 and a split command 281 to drive the respective relays $R_5$, $R_6$ and $R_7$, $R_8$ and $R_9$, $R_{10}$ and $R_{11}$, $R_{12}$, accordingly. As previously described, a relay $R_1$–$R_4$ is energized whenever its corresponding pairs of relays $R_5$, $R_6$ and $R_7$, $R_8$, etc., is energized. Therefore, when split command 281 receives data corresponding to such pairs, it outputs a signal to a driver 282 to drive the corresponding relays $R_1$–$R_4$. The read register ADR1R latches the data written into register ADR1W for read-back verification by test controller 14 over read bus 150.

Write register ADR2W, as shown in FIG. 9, has written into it, via internal write bus 152, 3-bit split code data, 1-bit bus swap data, 3-bit monitor data and 2-bit circuit selection data. The 3-bit split code data controls the functions to be performed, as indicated in the split code table of FIG. 9. The bus swap data controls bus swap circuit 44 and, in particular, the energization and deenergization of relay coils K8, K9 via line 122 of FIG. 6B for the bus swapping operation previously described. The monitor data control the relays (not shown in FIG. 6B or FIG. 6C) to enable monitors 64, 66, 68 to perform the monitoring function. The circuit selection data identify any one of the three positions of switch 38 to select the corresponding group of eight wires, as described in FIG. 4. All the data of write register ADR2W are latched in read register ADR2R and read back over read bus 150 so that test controller 14 can verify that the correct data have been written to register ADR2W.

A decoder 283 shown in FIG. 8 decodes the 2-bit circuit selection data received via a line 284. A driver 285 and a driver 286, which responds to the output of decoder 282 via a line 288, respond to the data written into write register ADR2W to control the energization of the various relays shown in FIG. 6B and FIG. 6C. Thus, for example, driver 286 controls line 114, line 116 and line 118 of FIG. 6C to select two groups of eight wires via switch 38, while driver 285 controls line 126 and line 128, as previously mentioned.

In operation, the logic module card 30 responds to various instructions received from the test controller 14 on control bus 22. These instructions include "write address", "read address", "read complement address", "write to register ADRØW", "write to register ADR1W", "write to register ADR2W", "read register ADRØR", "read register ADR1R", "read register ADR2R" and "$\overline{GO}$ line forced reset".

Generally, each logic module card 30 of each access shelf 16 listens to the information on control bus 22, but only responds to the instructions following a "write address" instruction containing its address preset in address decoder 170, except for "$\overline{GO}$ line forced reset". The addressed logic module card 30 then will continue to respond to the succeeding instructions until another "write address" containing the address of another access shelf 16 is on control bus 22. Thus, the plurality of access shelves 16 are connected to common access test bus 20, with each shelf 16 being ready to respond immediately to instructions and each automatically becoming idle when another's address is on common control bus 22. The only instruction immediately executed by all logic module cards 30, without waiting for the "write address", is the instruction "$\overline{GO}$ line forced reset", which occurs in response to a failure of test controller 14 or buses 20,22, as previously described.

An example of the instructions needed to enable access card 26-5 and access card 26-3 on access shelf 002 for a 6W configuration now will be given. Reference should be made to the table of FIG. 11 which shows the required steps. Note from the card enable decoder table of FIG. 10 that the binary number 15 must be stored in write register ADRØW to enable card 26-5 and card 26-3 and that, as previously described, the various bus transceivers of FIG. 7 invert the signals.

As shown in step 1 of the table of FIG. 11, the control bus 22, when idle, is all high or logic 1. Then, in step 2-1, which begins the "write address" instruction, $\overline{R}/W$ is set to write and $\overline{A}/D$ is set to address. $\overline{MCLK}$ is initially unchanged, then pulsed in step 2-2 after all other lines of control bus 22 are settled, and then removed in step 2-3 before such other lines are changed. This insures that any time delays and ringing associated with control bus 22, whose length may be, for example, up to one thousand feet, do not cause interpretation errors by the logic module cards 30. Step 2-1 also shows CYCLE being high, which is the normal cycle mode, and $\overline{GO}$ being low, indicating that bus 22 and test controller 14 have not failed.

In steps 2-1 to 2-3, bits 9-6 are 1001 (inverted), which identifies all access shelves 16, while bits 5-2 are 0010 (inverted) since it is assumed that access shelf 002 is to be activated. Bits 1-0 are, logically, 00 (inverted) to place data in register ADRØW of the addressed shelf 16, i.e., shelf 002. $\overline{XACK}$ of step 2-1, which is returned by the addressed logic module card 30 of shelf 002, indicates the correct address has been received.

Step 3 shows the "read address" instruction, where the read-back address (uncomplemented) of the responding access shelf 002 is confirmed. Step 4 is similar to step 3, except that $\overline{CYCLE}$ is low, causing the complemented read-back address to be returned to test controller 14. If two shelves 16 were incorrectly responding simultaneously, one of the two address bit patterns of step 3 or step 4 would be incorrect, and access would be stopped. Step 5 shows another idle period for control bus 22.

In step 6, which is the "write to register ADRØW" instruction, the binary value 15, i.e., logic 10000 inverted, is written to register ADRØW. Thus, at this time, access cards 26-3 and 26-5 of access shelf 002 are enabled. Then, in step 7, confirmation that the correct data were written to register ADRØW is made by performing the instruction "read from register ADRØR". At this time also, note that bit 8 and bit 9 are logic 0, corresponding to busy 1 and busy 2 and indicating that the corresponding cards were enabled. Finally, in step 8 the control bus 22 again is idle.

FIG. 12 illustrates in block diagram form the test controller 14 which has a data processor 290, for example, a programmable microprocessor 292. One particular programmable microprocessor 292 is the Intel 8085 manufactured by Intel Corporation, Sunnyvale, Calif. Microprocessor 290 generates or receives the various control signals, instructions and data previously described via common control bus 22.

FIG. 13 is a diagram of the front panel 294 of the test controller 14. Front panel 294 includes a common address select keyboard 296, a section 298 for use in connection with the plurality of access shelves 16 and a section 298' for use in connection with the plurality of access shelves 16'. To access a telephone circuit, button A or button B is depressed depending on whether the plurality of access shelves 16 or plurality of access shelves 16' are to be activated. Then, a code is generated by first depressing the number keys of the keyboard 296 and entered by then depressing the button "access", whereby the microprocessor 292 produces A/D0-A/D9 for addressing the desired access shelf 16 or access shelf 16'. The code includes data identifying whether the shelf to be accessed is a 4W or 6W configuration.

Section 298 includes a display 300 to display various messages, as will be described in connection with the flow charts of FIGS. 14–16. Section 298 also includes a monitor/test button 302 which, when depressed, switches the system 10 between an audio monitor mode and test mode, as indicated by the energization of an audio monitor LED 304 and test LED 306. Audio monitoring of a telephone circuit 12 is performed after system 10 performs a well-known continuity test to be further described and before testing the circuit 12 to be accessed. An access release button 308 is depressed after completing the testing to release the accessed circuit 12.

Section 298' has similar components as indicated by like reference numerals such as display 300'.

With reference to the flow chart of FIG. 14, after inputting the code via keyboard 296, first the shelf-type data (block 310) is obtained or read from read register ADRØR. If the particular addressed shelf 16 is configured as a 6W shelf (block 312), the access is illegal (block 314 and block 316) if a 4W shelf 16 has been addressed through the code inputted via keyboard 296; consequently the message ILLEGAL is displayed on display 300 (block 318). If the access is legal (block 314), but the addressed shelf 16 is busy (block 320), as determined by the busy data in read register ADRØR, then a busy access point (block 322) has been addressed and the message BUSY is displayed (block 318).

If the addressed shelf 16 is not busy (block 320), then microprocessor 292 computes the card select code (block 324) to be written in address register ADRØW. Then the access shelf 16 is addressed (block 326), and if vacant (block 328) because no selected card has been installed (block 330), then the message NO ACCESS CARD is displayed (block 318). If not vacant (block 328), but if no access is allowed (block 332 and block 334) because the telephone circuits are secure, as set by switch 106 of FIG. 5, then the message NO ACCESS is displayed (block 318). If the circuits are not secured, but are protected (block 336 and block 338), then the message PROTECTED is displayed (block 318). Access to protected circuits may then be made by depressing again the button "access" on keyboard 296. If not protected (block 336) then the program continues as shown in FIG. 15, which now will be described.

First, the continuity test of the accessed circuit is set up (block 340) and then performed (block 342). If the continuity test is successful (block 344), and if the continuity test is with respect to a 2W E/M circuit (block 346), then a metallic monitoring test is performed (block 348). Otherwise, an audio monitoring test of the accessed circuit is performed (block 350). If the continuity test is unsuccessful, then a message FAULT (block 351) is displayed.

With reference to FIG. 14, if the shelf type is not a 6W type (block 312), and is a 4W shelf (block 352), then the program continues as will be described in connection with FIG. 16. If there is no shelf (block 354) a return is made.

The program shown in FIG. 16 for a 4W shelf is similar to the program show in FIG. 14 for a 6W shelf. Therefore, like reference numerals are used to show like blocks such as the legality of the access number, i.e., block 314 of FIG. 14 and block 314' of FIG. 16. Consequently, a detailed discussion of FIG. 16 is not necessary to an understanding of this program.

There will now be given a more specific description of the overall system operation or manner in which apparatus 10 can be used by an operator to make a 6W access, a 4W access and a 2W access.

SYSTEM OPERATION—6W ACCESS

The system operator will request access to a particular 6W circuit by inputting, for example, a six-digit code to microprocessor 292 using keyboard 296 of test controller 14. The microprocessor 292 calculates from this code the address of the particular access shelf 16 to be controlled and then reads the register ADRØR of this addressed shelf 16 to determine if it is a 4W or 6W shelf 16. In this example it is assumed that the shelf 16 is a 6W shelf 16, which, as previously mentioned, can access up to ninety-six 6W circuits. These ninety-six 6W circuits are in a range 000 to 095, which is given within the six-digit code entered by the operator using keyboard 296.

Having determined that the addressed access shelf 16 is a 6W shelf 16, microprocessor 292 then converts the range data of the six-digit code to a desired card group number and relay number on the desired card. As shown in the rightmost column of FIG. 10, the 6W shelf 16 has eight groups of cards, with each group consisting of two cards, such as cards 26-3 and 26-5, and having twelve 6W addresses for a total of 96 addresses per 6W shelf 16.

Microprocessor 292 then determines if any access shelf 16 of the display chain is busy by reading from register ADRØR of the addressed shelf 16. In particular, microprocessor 292 reads the bus 1 busy data, which indicates if any access shelf 16 is connected to the bus 20 via respective switches 54,56, and the bus 2 busy data which indicates if any access shelf 16 is connected to bus 20 via switch 62. As previously mentioned, both bus 1 busy and bus 2 busy must indicate bus 20 is available to make a 6W access via the addressed shelf 16 currently being addressed in response to the six-digit code currently inputted by the operator.

If it is assumed that the desired 6W access can be made, microprocessor 292 then writes the card group number into register ADRØW, i.e., number 15 in the example for cards 26-5, 26-3, of the addressed shelf 16, and the relay numbers into register ADR1W, as well as the switch 38 and bus swap data into register ADR2W. The connection of the desired 6W circuit can then be made to the bus 20.

SYSTEM OPERATION—4W ACCESS

This system operation is similar to the 6W access operation previously described. When the operator inputs via keyboard 296 a six-digit code to access a given 4W circuit, microprocessor 292 calculates from this code the address of the particular access shelf 16 to be controlled and then reads register ADRØR to determine if it is a 4W shelf 16. If it is, as it is assumed to be for this example, microprocessor 292 then converts the six-digit code to a desired card number and relay number and writes this data to register ADRØW and ADR1W, as well as the switch 38 and bus swap data to register ADR2W. As previously indicated, microprocessor 292 considers the 4W shelf 16 to have twelve groups of cards, as indicated in FIG. 10, with each group consisting of one card and having twelve accesses for a total of 144-4W accesses per 4W access shelf 16.

In order to make the 4W access, the bus 1 busy data stored in register ADRØR has to indicate that no access shelf 16 has made an access via switch 54 and switch 56, and microprocessor 292 determines this by reading this register ADRØR.

SYSTEM OPERATION—2W ACCESS

A 2W access is initiated and made in a similar manner as a 4W access is made. Microprocessor 292 determines if the shelf 16 being controlled is a 4W or 6W shelf 16 by reading the shelf-type data in register ADRØR. This is sufficient since a 2W access can be made in a 4W or a 6W shelf 16. For a 2W access, either the bus 1 busy or the bus 2 busy data stored in the register ADRØR of the controlled or addressed shelf 16 need indicate that the bus 20 is not busy to make the 2W access.

Attached as an Appendix A to this specification as a part thereof are sixteen pages A-1 to A-16 of applications software listings that implement the flow charts of FIGS. 14–16, the other various functions previously described in connection with the other drawings and still other functions that will become apparent from the listings. Each routine of the applications software listings is preceded by a title indicating the function that is performed. Thus, for example, page A-1 has a listing entitled "Get Number to be accessed", which relates to the address of the access shelf 16 or 16'; page A-2 has a listing entitled "Is number for daisy chain 1 or 2?", which relates to the chain of access shelves 16 or chain of access shelves 16'; and page A-3 has a routine entitled "Check for shelf type (bits 1 and 2)", which relates to whether the access shelf is a 4W or 6W type. This applications software operates with the Intel 8085 microprocessor previously mentioned.

With respect to the continuity test, the telephone circuits 12 being accessed will not be split until an operator of system 10 knows that a telephone line has been accessed and not that, for example, a defective relay has failed to operate and caused the operator to believe that a telephone circuit has been accessed. Various continuity test circuits and procedures may be utilized, all of which are intended to determine if there is DC continuity on a 2W circuit.

Then, if the continuity test is successful, the audio monitoring test is performed also prior to splitting the telephone circuits. This is accomplished by operating the relays (not shown) associated with monitor 64, monitor 66 and monitor 68. If the particular circuits corresponding to the wires of line 50, line 52 and line 58 or line 60 are not in use, i.e., no voice or data is being transmitted, then these circuits can be split or interrupted and connected to common access test bus 20 for test purposes.

To summarize the advantages of the present invention, the overall system 10 is sized or has a capacity for use in small telephone offices where a large switching system having a central controller servicing in common a plurality of test panels or stations would be inefficiently used and not cost-effective. In the small telephone office, system 10 can be installed in a modular manner by simply including any number of access shelves 16 or shelves 16' in the daisy chain to test the telephone circuits 12, as is needed. Furthermore, a number of systems 10 can be located throughout the small telephone office, as is needed to test all the circuits 12 in such an office. Therefore, with various systems 10 having separate test controllers 14 with their microprocessors distributed about the office, a failure of one system 10 will not result in a failure of the other systems 10.

In addition, the system 10 has been described as having the test controller 14 in the telephone office, together with the plurality of access shelves 16,16'. This can be considered to be a "local" system. However, the test controller 14 can be physically located elsewhere at a remote site, making this a "remote" system. Or, alternatively, the test controller 14 can be on-site, but instructions from a remote location can be sent to the microprocessor 292, as an alternative to using the keyboard 296, to cause microprocessor 292 to control the 6W, 4W or 2W access, as desired. Moreover, by using the daisy chain, one test controller 14 can address directly any one of the plurality of access shelves in the chain. In prior systems, a component known as a concentrator must be used as an interface between access shelves and a test controller Also the present invention has an advantage in that a reduced average number of relays over prior systems are needed, resulting in a substantial cost savings in view of the many relays that are needed to access all the telephone circuits 12 in a given office. Specifically, as was shown in connection with FIG. 5, to access twelve wires $W_1-W_{12}$ via line 32-1, constituting, for example, two 6W circuits, three relays $R_1$, $R_5$, $R_6$ are utilized. This is an average of 1.5 relays per 6W circuit. As was previously explained, prior systems use, for example, two relays to access a 6W circuit. Not only is this an inefficient usage of contacts, but this is a higher average of 2 relays per 6W circuit.

Moreover, the present invention is flexible in that it can be easily adapted as a 4W or 6W configuration. This enables 2W, 4W and 6W accesses.

Finally, those wires W which are not accessed are closed or normalled through at the input to the access shelves 16 by access cards 26 and at the input to the bus select card 28, which physically are near the wires W. Therefore, the normalled through wires do not extend over a large distance in the system 10, resulting in a minimum of disturbances or hits which otherwise would occur if these wires were normalled through, for example, at test controller 14. A similar advantage occurs with the present invention by locating monitor circuits 64, 66, 68 at the access shelves 16.

Other aspects, objects and advantages of the invention can be obtained from a study of the drawings, the disclosure and the appended claims.

APPENDIX A

```
;Get Number to be accessed
;***************************
```

```
0000 F5              PUSH    PSW
0001 C5              PUSH    B
0002 D5              PUSH    D
0003 E5              PUSH    H
0004 CD 39 06    C   CALL    CNUBR
0007 E1              POP     H
```

```
0008 D1                       POP     D
0009 C1                       POP     B
000A D2 97 04      C          JNC     EQBAS
000D F1                       POP     PSW 000E 7E                       MOV     A,M
000F FE 00                    CPI     0
0011 CA 2E 00      C          JZ      ALLOK

0014 E5                       PUSH    H
0015 D5                       PUSH    D
0016 21 05 00      E          LXI     H,NOBUFA+5
0019 11 05 00      E          LXI     D,NOBUFB+5
001C 1A                       LDAX    D
001D BE                       CMP     M
001E C2 2C 00      C          JNZ     BALREG
0021 23                       INX     H
0022 13                       INX     D
0023 1A                       LDAX    D
0024 BE                       CMP     M
0025 D1                       POP     D
0026 E1                       POP     H
0027 CA 5E 05      C          JZ      BUSY
```

APPENDIX A

```
;Is number for daisy chain 1 or 2?
;***********************************

002A E5                       PUSH    H
002B D5                       PUSH    D

002C D1            BALREG:    POP     D
002D E1                       POP     H
                   ALLOK:
002E                          GDBC    INDEX
0033 FE 07                    CPI     (LOW MAXIDX+1)
0035 D2 56 05      C          JNC     ILEGAL
0038                          GDBC    DIGIT6
003D FE 1A                    CPI     BLANK
003F CA 47 00      C          JZ      SKPONE
0042 FE 02                    CPI     LOW ONE+1
0044 D2 56 05      C          JNC     ILEGAL
                   SKPONE:
0047 F5                       PUSH    PSW
0048                          PDDE    MCLKA,BUSIDE
004E F1                       POP     PSW
004F FE 01                    CPI     ONE
0051 C2 56 00      C          JNZ     EXAMIN
0054 36 40                    MVI     M,LOW MCLKB
0056 3A 00 00      E EXAMIN:  LDA     XBUFFR
0059 FE 00                    CPI     0
005B CA 72 00      C          JZ      BUSEL
005E E5                       PUSH    H
005F C5                       PUSH    B
0060 21 00 00      E          LXI     H,NOBUFA
0063 79            MOV        A,C
0064 BD                       CMP     L
0065 3E 80                    MVI     A,LOW MCLKA
```

```
0067 CA 6C 00      C                   JZ      TSIDEB
006A 3E 40                              MVI     A,LOW MCLKB
006C C1                      TSIDEB:    POP     B
006D E1                                 POP     H
006E BE                                 CMP     M
006F C2 5E 05     C                     JNZ     BUSY
0072 C5                      BUSEL:     PUSH    B
0073                                    GDBC    DIGIT5
0078 FE 1A                              CPI     BLANK
007A C2 7F 00     C                     JNZ     BUSELC
007D 3E 00                              MVI     A,0
                             BUSELC:
007F 0E 90                              MVI     C,BASADD
0081 B1                                 ORA     C
0082                         PDADE      PERADD
0087 C1                                 POP     B
0088 CD 72 05     C                     CALL    ADDPER
008B C2 67 05     C                     JNZ     BUSERR
                                    ;   Check for shelf type (bits 1 and 2)
                                    ;   **************************************

008E                                    RDREG   R0
0093                                    GDDE    BUSDAT
0098 1F                                 RAR
0099 E6 03                              ANI     03H
009B FE 03                              CPI     ST6W
009D CA DC 02     C                     JZ      SIXWR
00A0 FE 01                              CPI     ST4W
00A2 C2 5C 04     C                     JNZ     TOTHER
                                    ;   4 Wire Access Program
                                    ;   **********************

;   Check if access number is legal
                                    ;   **********************************
                             FOURWR:
00A5                                    PDBC    OFF4W,CKTSTS
00AD                                    GDBC    DIGIT4
00B2 FE 01                              CPI     ONE
00B4 C2 C2 00     C                     JNZ     IFBLNK
00B7 CD B2 06     C                     CALL    DIG2_3
00BA FE 44                              CPI     44H
00BC DA CC 00     C                     JC      POPSTK
00BF C3 56 05     C                     JMP     ILEGAL
00C2 FE 1A                   IFBLNK:    CPI     BLANK
00C4 CA CC 00     C                     JZ      POPSTK
00C7 FE 00                              CPI     0
00C9 C2 56 05     C                     JNZ     ILEGAL
                             POPSTK:
00CC                                    GDBC    DIGIT1
00D1 21 56 05     C                     LXI     H,ILEGAL
00D4 E5                                 PUSH    H
00D5 B7                                 ORA     A
00D6 C8                                 RZ
00D7 FE 03                              CPI     03H
00D9 C8                                 RZ
00DA FE 05                              CPI     05H
00DC D0                                 RNC
00DD E1                                 POP     H
```

;       Check if Buses are busy
;       *****************************

```
00DE C5                     PUSH    B
00DF 4F                     MOV     C,A
00E0 C5                     PUSH    B
00E1 CD B9 02      C        CALL    GETCOD
00E4 C1                     POP     B
00E5 C2 01 01      C        JNZ     BUSOK
00E8 7C                     MOV     A,H
00E9 17                     RAL
00EA D2 D1 02      C        JNC     RBUSY
00ED 79                     MOV     A,C
00EE C6 05                  ADI     5
00F0 4F                     MOV     C,A
00F1 CD B9 02      C        CALL    GETCOD
00F4 CA D1 02      C        JZ      RBUSY
00F7 C1                     POP     B
00F8                        PDBC    0FH,CKTSTS
0100 C5                     PUSH    B
```
;
;       Bus is not busy, continue with acces
;       *****************************************
```
0101 C1            BUSOK:   POP     B
0102 C5                     PUSH    B
0103 D5                     PUSH    D
0104 7C                     MOV     A,H
0105 E6 7C         UPDATE:  ANI     01111100B
0107 17                     RAL
0108                        PDADE   R2REG
010D E6 F0                  ANI     11110000B
010F                        PDADE   ABCD
0114 CD 04 06      C        CALL    LSTTOT
```
;       find card position
;       *********************
```
0117    .                   GDBC    DIGIT4
011C FE 01                  CPI     ONE
011E CA 31 01      C        JZ      ADDFOR
0121 CD B2 06      C        CALL    DIG2_3
0124 FE 96                  CPI     96H
0126 D2 31 01      C        JNC     ADDFOR
0129 0E 12                  MVI     C,12H
012B CD 9B 06      C        CALL    BCDDIV
012E C3 40 01      C        JMP     SAVRES
0131 CD B2 06      C ADDFOR: CALL   DIG2_3
0134 06 04                  MVI     B,04H
0136 CD 9B 06      C        CALL    BCDADD
0139 0E 12                  MVI     C,12H
013B CD 9B 06      C        CALL    BCDDIV
013E C6 08                  ADI     8
0140 3C            SAVRES:  INR     A
0141 07                     RLC
0142 07                     RLC
0143 07                     RLC
0144 D1                     POP     D
0145                        PDADE   BUSDAT
```
;Find circuit number(Normal/Out of serv.)
;*******************************************
```
014F 78                     MOV     A,B
0150                        PDADE   BSYCKT
0155 CD F4 05      C        CALL    POSBIT
```

```
0158                          PDADE   INTG02
015D 04                       INR     B
015E 23                       INX     H
015F 70                       MOV     M,B
0160 C1                       POP     B
0161                          WRREG   R0
0166 C0                       RNZ
0167 CD 85 04      C          CALL    COMPER
016A C2 67 05      C          JNZ     CTLERR

;Calculate if test busses  must be swapped
                              ;************************************
                     SWPBIT:
016D                          GDBC    CKTSTS
0172 FE 0A                    CPI     0AH
0174 C2 80 01      C          JNZ     SECCHO
0177 CD A2 02      C  FSTCHO: CALL    SLOT
017A CA 86 01      C          JZ      SETSWP
017D C3 8E 01      C          JMP     NOSWAP
0180 CD A2 02      C  SECCHO: CALL    SLOT
0183 CA 8E 01      C          JZ      NOSWAP
0186                  SETSWP: GDDE    R2REG
018B F6 08                    ORI     00001000B
018D 77                       MOV     M,A
                     NOSWAP:
018E                          GDDE    R2REG
0193 F6 76                    ORI     01110110B
0195                          PDADE   BUSDAT
019A                          WRREG   R2
019F C0                       RNZ ;check if vacant
                              ;****************
01A0                          RDREG   R0
01A5                          GDDE    BUSDAT+1
01AA 21 10 00                 LXI     H,BSYBUF
01AD 19                       DAD     D
01AE A6                       ANA     M
01AF C2 65 05      C          JNZ     VACANT
01B2 CD D8 01      C          CALL    CRTYPE ;Check card type
                     TYPE?:   ;****************
01B5 E6 07                    ANI     00000111B
01B7 FE 05                    CPI     00000101B
01B9 CA 8F 02      C          JZ      C9716
01BC FE 07                    CPI     00000111B
01BE CA 8F 02      C          JZ      C9716
01C1 FE 06                    CPI     00000110B
01C3 CA DC 03      C          JZ      NOSTS
01C6 FE 03                    CPI     00000011B
01C8 C2 5C 04      C          JNZ     CTOTH
01CB                          GDDE    BSYCKT
01D0 FE 06                    CPI     6
01D2 D2 65 05      C          JNC     VACANT
01D5 C3 DC 03      C          JMP     NOSTS
01D8                  CRTYPE: RDREG   R3
01DD CD A2 02      C          CALL    SLOT
01E0 CA FE 01      C          JZ      RIGHT
01E3                  LEFT:   GDDE    BUSDAT
01E8 0F                       RRC
01E9 0F                       RRC
01EA 0F                       RRC
```

```
01EB 0F                              RRC
01EC 0F                              RRC
01ED E6 07                           ANI     07H
01EF F5                              PUSH    PSW
01F0                                 GDDE    BUSDAT+1
01F5 07                              RLC
01F6 07                              RLC
01F7 07                              RLC
01F8 E6 18                           ANI     18H
01FA E1                              POP     H
01FB B4                              ORA     H
01FC 67                              MOV     H,A
01FD C9                              RET
01FE                 RIGHT:          GDDE    BUSDAT
0203 E6 1F                           ANI     00011111B
0205 67                              MOV     H,A
0206 C9                              RET
0207 CD D8 01     C   RECHEK:        CALL    CRTYPE
020A E6 07                           ANI     00000111B
020C FE 06                           CPI     00000110B
020E CA 4D 02     C                  JZ      C9713
0211 FE 03                           CPI     00000011B
0213 C0                              RNZ
                                ;    OUT OF SERVICE CARD(9713)
                                ;    **************************

024D E5              C9713:          PUSH    H
024E 21 75 02     C                  LXI     H,BITONE
0251 E5                              PUSH    H
0252                                 GDDE    BSYCKT
0257 FE 03                           CPI     3
0259 C8                              RZ
025A FE 04                           CPI     4
025C C8                              RZ
025D FE 05                           CPI     5
025F C8                              RZ
0260 FE 09                           CPI     9
0262 C8                              RZ
0263 FE 10                           CPI     10H
0265 C8                              RZ
0266 FE 11                           CPI     11H
0268 C8                              RZ
0269 E1              BITTWO:         POP     H
026A F1                              POP     PSW
026B E6 08                           ANI     00001000B
026D FE 08                           CPI     00001000B
026F C2 86 02     C                  JNZ     NORML2
0272 C3 7D 02     C                  JMP     OUTSER
0275 F1              BITONE:         POP     PSW
0276 E6 10                           ANI     00010000B
0278 FE 10                           CPI     00010000B
027A C2 86 02     C                  JNZ     NORML2
027D                 OUTSER:         GDBC    LEDDAT
0282 F6 00        E                  ORI     LOW MSKMKE
0284 77                              MOV     M,A
0285 C9                              RET
0286                 NORML2:         GDBC    LEDDAT
028B F6 00        E                  ORI     LOW MSKBSY
028D 77                              MOV     M,A
028E C9                              RET
028F E5              C9716:          PUSH    H       ;Calculation 9716
0290                                 GDDE    INTG02  ;****************
```

```
095 E1                              POP     H
0296 FE 01                          CPI     ONE
0298 C2 DC 03    C                  JNZ     NOSTS
029B 7C                             MOV     A,H
029C 0F                             RRC
029D 0F                             RRC
029E 0F                             RRC.
029F C3 B2 03    C                  JMP     CKSTS

;Find slot position in Access shelf
                                ;**********************************

SLOT:
02A2                                GDDE    INTG01
02A7 FE 08                          CPI     08H
02A9 C8                             RZ
02AA FE 10                          CPI     10H
02AC C8                             RZ
02AD FE 28                          CPI     28H
02AF C8                             RZ
02B0 FE 30                          CPI     30H
02B2 C8                             RZ
02B3 FE 48                          CPI     48H
02B5 C8                             RZ
02B6 FE 50                          CPI     50H
02B8 C9                             RET

;Check if test bus is free
                                ;*************************

GETCOD:
02B9 06 00                          MVI     B,0
02BB 21 D5 02    C                  LXI     H,WCODE
02BE 09                             DAD     B
02BF 7E                             MOV     A,M
02C0 F5                             PUSH    PSW
02C1 E6 03                          ANI     03H
02C3 4F                             MOV     C,A
02C4 21 10 00                       LXI     H,BSYBUF
02C7 19                             DAD     D
02C8 77                             MOV     M,A
02C9 21 07 00                       LXI     H,BUSDAT+1
02CC 19                             DAD     D
02CD 7E                             MOV     A,M
02CE A1                             ANA     C
02CF E1                             POP     H
02D0 C9                             RET
02D1 C1                      RBUSY: POP     B
02D2 C3 5E 05    C                  JMP     BUSY

;     Table for 4wire Access
                                ;     **********************
                                ;           binary #

WCODE:
                                    DB      0
02D5 00                             DB      10001001B
02D6 89                             DB      10010001B
02D7 91                             DB      0
02D8 00                             DB      00011001B
02D9 19

02DA 22                             DB      00100010B
02DB 62                             DB      01100010B
```

```
;        Card type = 6W
;        **************
;        if status switch is set
;        then determine status type
;        else continue to NO STATUS (NOSTS)

0390                              GDDE    INTG02
0395 FE 01                        CPI     ONE
0397 C2 DC 03    C                JNZ     NOSTS
039A CD B2 06    C                CALL    DIG2_3
039D FE 48                        CPI     48H
039F D2 AD 03    C                JNC     UPPER
03A2                      LOWER:  GDDE    BUSDAT
03A7 1F                           RAR
03A8 1F                           RAR
03A9 1F                           RAR
03AA C3 B2 03    C                JMP     CKSTS
03AD                      UPPER:  GDDE    BUSDAT+1
03B2 E6 03                CKSTS:  ANI     03H
03B4 FE 03                        CPI     03H
03B6 CA DC 03    C                JZ      NOSTS
;        Determine status type
;        **********************
03B9 FE 02                        CPI     LOW PROT
03BB CA C8 03    C                JZ      PROTED
03BE FE 01                        CPI     LOW NOACCS
03C0 C2 DC 03    C                JNZ     NOSTS ;        No access status
;        ****************
                          NACCS:
03C3 3E 00       E                MVI     A,LOW MGNACC
03C5 C3 67 05    C                JMP     CTLERR ;        Protected status
;        ****************
                          PROTED:
03C8                              GDDE    STSDAT
03CD FE 05                        CPI     MGPROT
03CF CA DC 03    C                JZ      NOSTS
03D2 3E 05                        MVI     A,LOW MGPROT
03D4                              PDADE   STSDAT
03D9 C3 67 05    C                JMP     CTLERR ;        **********************
                          NOSTS:
03DC                              PDDE    0,STSDAT
03E2                              GDDE    R2REG
03E7 E6 08                        ANI     00001000B
03E9 F6 76                        ORI     01110110B
03EB                              PDADE   BUSDAT
03F0                              GDDE    REMD01
03F5                              PDADE   BUSDAT+1
03FA                              WRREG   R2
03FF C0                           RNZ
0400                              GDDE    INTG02
0405 E6 CF                        ANI     11001111B
0407                              PDADE   BUSDAT
040C                              WRREG   R1
0411 C0                           RNZ ;        Call continuity test
;        ********************
;        If results do not match
;             then fault occurred
```

```
                                    ;           else continue

0412 CD 5F 04      C                CALL    DOTEST
0415 CA 20 04      C                JZ      DELET
0418 CD 5F 04      C                CALL    DOTEST
041B 3E 03                          MVI     A,LOW MGFALT
041D C2 67 05      C        JNZ     FAULT

;Get pairs, bus swap and OR with Monitor code
                                    ;*******************************************
                            DELET:
0420                                GDBC    DIGIT1
0425 FE 05                          CPI     05H
0427 DA 36 04      C                JC      OKASIS
042A                                GDDE    R2REG
042F E6 CC                          ANI     11001100B
0431 F6 44                          ORI     01000100B
0433 C3 3D 0       C                JMP     FINAL OKASIS:
0436                                GDDE    R2REG
043B E6 F8                          ANI     11111000B
                            FINAL:
043D                                PDADE   BUSDAT
0442                                GDDE    REMD01
0447                                PDADE   BUSDAT+1
044C                                WRREG   R2

;       BRIDGE/TERM CARD (9715 access cards)
                            ;       ************************************
0214 E5            C9715:            PUSH    H
0215 21 33 02      C                LXI     H,BITRHT
0218 E5                             PUSH    H
0219                                GDDE    BSYCKT
021E FE 03                          CPI     3
0220 C8                             RZ
0221 FE 04                          CPI     4
0223 C8                             RZ
0224 FE 05                          CPI     5
0226 C8                             RZ
0227 E1            BITLFT: POP      H
0228 F1                             POP     PSW
0229 E6 08                          ANI     00001000B
022B FE 08                          CPI     00001000B
022D CA 44 02      C                JZ      NORML1
0230 C3 3B 02      C                JMP     BRIDGE
0233 F1            BITRHT: POP      PSW
0234 E6 10                          ANI     00010000B
0236 FE 10                          CPI     00010000B
0238 CA 44 02      C                JZ      NORML1
023B               BRIDGE: GDBC     LEDDAT
0240 F6 00         E                ORI     LOW MSKTRM
0242 77                             MOV     M,A
0243 C9                             RET
                   NORML1:          GDBC    LEDDAT
0244
0249 F6 00         E                ORI     LOW MSKREM
024B 77                             MOV     M,A
024C C9                             RET ;       If a 9715 or 9713 card
                                    ;               Then check status
                                    ;                       Else Just return 0451                                GDBC    CKTSTS
0456 FE 00                          CPI     0
```

```
0458 C8                              RZ
0459 C3 07 02        C               JMP     RECHEK
                          TOTHER:
                          CTOTH:
045C C3 65 05        C               JMP     VACANT

;         Continuity Test program
                          ;         ************************
                          DOTEST:
045F CD D1 05        C               CALL    CONTST
0462 2F                              CMA
0463 E6 3F                           ANI     3FH
0465 F5                              PUSH    PSW
0466                     FNDMSK: GDBC     CKTSTS
046B FE 00                           CPI     0
046D C2 75 04        C               JNZ     W4FRST
0470 26 3F                           MVI     H,3FH
0472 C3 81 04        C               JMP     CHKMSK
0475 FE 0A              W4FRST: CPI     0AH
0477 C2 7F 04        C               JNZ     W4SEC
047A 26 0F                           MVI     H,0FH
047C C3 81 04        C               JMP     CHKMSK
047F 26 30              W4SE:   MVI     H,30H
0481 F1                 CHKMSK: POP     PSW
0482 A4                              ANA     H
0483 BC                              CMP     H
0484 C9                              RET COMPER:
0485                                 GDDE    BUSDAT
048A                                 PDADE   TMPDT1
048F E6 F8                           ANI     0F8H
0491 21 0B 00                        LXI     H,INTG01
0494 19                              DAD     D
0495 BE                              CMP     M
0496 C9                              RET ;Modified access done when the base numbers
                          ;are found to be equal
                          ;*******************************************
                          EQBAS:

0497 E5                              PUSH    H
0498 2B                              DCX     H
0499 2B                              DCX     H
049A 7E                              MOV     A,M
049B E6 47                           ANI     01000111B
049D FE 00                           CPI     0
049F E1                              POP     H
04A0 C2 5D 05        C               JNZ     EQBUSY
04A3 F1                              POP     PSW
04A4 FE 00                           CPI     0FF6W
04A6 C2 16 05        C               JNZ     EQUAL
04A9 D5                 ACCSOK: PUSH    D
04AA E5                              PUSH    H
04AB 5F                              MOV     E,A
04AC                                 GDBC    DIGIT1
04B1 83                              ADD     E
04B2 57                              MOV     D,A
04B3 E1                              POP     H
04B4 EB                              XCHG
04B5 E5                              PUSH    H
```

```
04B6                        GDDE    DIGIT1
04BB  D1                    POP     D
04BC  83                    ADD     E
04BD  5F.                   MOV     E,A
04BE  EB                    XCHG
04BF  11 00 00    E         LXI     D,RELTBL
04C2  E5                    PUSH    H
04C3  26 00                 MVI     H,0
04C5  19                    DAD     D
04C6  7E                    MOV     A,M
04C7  E1                    POP     H
04C8  6C                    MOV     L,H
04C9  26 00                 MVI     H,0
04CB  19                    DAD     D
04CC  6E                    MOV     L,M
04CD  D1                    POP     D

;Test for illegal last digit configuration
;*******************************************

04CE  67                    MOV     H,A
04CF  7D                    MOV     A,L
04D0  A7                    ANA     A
04D1  CA 56 05    C         JZ      ILEGAL
04D4  CD 30 06    C         CALL    COMBIT
04D7  C2 5E 05    C         JNZ     BUSY
04DA  E5                    PUSH    H
04DB  7D                    MOV     A,L
04DC  1F                    RAR
04DD  E6 70                 ANI     01110000B
04DF                        PDADE   LSTDIG
04E4  E1                    POP     H
04E5  7C                    MOV     A,H
04E6  1F                    RAR
04E7  E6 70                 ANI     01110000B
04E9                        PDADE   TOTDIG

;       Check if new access is an E/M circuit
;       ****************************************
04EE                        GDBC    DIGIT1
04F3  FE 05                 CPI     5
04F5  D8                    RC
04F6                        RDREG   R2
04FB                        GDDE    LSTDIG
0500  2F                    CMA
0501  F5                    PUSH    PSW
0502                        GDDE    BUSDAT
0507  E1                    POP     H
0508  A4                    ANA     H
0509  F6 44                 ORI     01000100B
050B                        PDADE   BUSDAT
0510                        WRREG   R2
0515  C9                    RET
```

```
                                ;4wire access with equal base number
                                ;************************************

EQUAL:
0516 E5                                 PUSH    H
0517 F5                                 PUSH    PSW
0518 C5                                 PUSH    B
0519 D5                                 PUSH    D
051A 11 51 05       C                   LXI     D,WEXIT
051D D5                                 PUSH    D
051E EB                                 XCHG
051F                                    GDDE    DIGIT1
0524 57                                 MOV     D,A
0525                                    GDBC    DIGIT1
052A FE 05                              CPI     05H
052C 21 56 05       C                   LXI     H,ILEGAL
052F D0                                 RNC
0530 FE 00                              CPI     0
0532 C8                                 RZ
0533 FE 03                              CPI     03
0535 C8                                 RZ
0536 FE 04                              CPI     04H
0538 21 5E 05       C                   LXI     H,BUSY
053B D0                                 RNC
053C FE 02                              CPI     02H
053E CA 49 05       C                   JZ      W0_W1
0541 7A                         W2_W3:  MOV     A,D
0542 FE 02                              CPI     02
0544 C0                                 RNZ
0545 21 A9 04       C                   LXI     H,ACCSOK
0548 C9                                 RET 0549 7A                         W0_W1:  MOV     A,D
054A FE 01                              CPI     01
054C C0                                 RNZ
054D 21 A9 04       C                   LXI     H,ACCSOK
0550 C9                                 RET
                                WEXIT:
0551 D1                                 POP     D
0552 C1                                 POP     B
0553 F1                                 POP     PSW
0554 E3                                 XTHL
0555 C9                                 RET

;       Error codes returned if access failed
                                ;       ****************************************
                                ;

FAILAC:                 ;illegal number
                                ILEGAL:
0556                                    PDDE    MGILEG,COMSTS
055C C9                                 RET 055D F1                         EQBUSY: POP     PSW
                                BUSY:                   ;Busy test bus 055E                                    PDDE    MGBUSY,COMSTS
0564 C9                                 RET VACANT:                 ;No access allowed,caused by
                                                        ;no access card present
0565 3E 04                              MVI     A,LOW MGVACT
```

```
FAULT:              ;No access allowed;caused by
                    ;continuity test failure BUSERR:    ;No access allowed, caused by
                        ;address error or bus error
             CTLERR:    ;No access allowed;caused by
                        ;card select bits mismatch
0567  F5                ;after writing data
0568  CD 00 00    E       PUSH    PSW
056B  F1  *               CALL    RELEAS
056C                      POP     PSW
0571  C9                  PDADE   CONSTS
                          RET $INCLUDE(ACCESS.RTN)
0700                      END

;LER ERRORS =   0
```

We claim:

1. A system for accessing a plurality of telephone electrical circuits, comprising:
   (a) a common access test bus having a plurality of bus wires;
   (b) a common control bus;
   (c) at least one access shelf for connecting at least one of the telephone electrical circuits to at least one of said bus wires of said common access test bus in response to control signals on said common control bus, and wherein said system is adaptable to include at least one other said access shelf for connecting at least one other telephone electrical circuit to said at least one bus wire of said common access test bus in response to control signals on said common control bus, said one access shelf and said other access shelf being individually selectively controllable to connect said one telephone circuit or said other telephone circuit, respectively, to said at least one bus wire; and
   (d) a test controller having programmable data processing means for selectively generating the control signals onto said common control bus to individually and directly control said one access shelf and said other access shelf to connect, respectively, said one telephone electrical circuit and said other telephone electrical circuit to said at least one bus wire, and said common access test bus and said common control bus being connected to said test controller and to said one access shelf and said other access shelf.

2. An access shelf for connecting to an access test bus at least first and second telephone electrical circuits, the access test bus having first bus wires and second bus wires, comprising:
   (a) means for accessing the first telephone electrical circuit and the second telephone electrical circuit; and
   (b) bus select means, coupled to said accessing means, for selecting and connecting the accessed first telephone electrical circuit to the first bus wires and for selecting and connecting the accessed second telephone electrical circuit to the second bus wires, said bus select means including bus swapping means for connecting the accessed first telephone electrical circuit to the second bus wires and the accessed second telephone electrical circuit to the first bus wires.

3. An access shelf for connecting a plurality of telephone electrical circuits to an access test but connected to a test controller, said access shelf comprising:
   (a) means for coupling selected telephone electrical circuits to the test bus; and
   (b) means for monitoring the selected telephone electrical circuits.

4. An access shelf, according to claim 3, wherein said monitoring means comprises a high-impedance circuit.

5. An access shelf, according to claim 4, wherein said high-impedance circuit is an amplifier.

6. An access shelf, according to claim 3, wherein said means for coupling comprises a plurality of paths being connectable to the access test bus, wherein the selected electrical circuits are coupled to said paths, respectively, and wherein said means for monitoring comprises a plurality of high-impedance circuits being connectable in-circuit to said plurality of paths, respectively.

7. An access shelf, according to claim 6, wherein each of said high-impedance circuits is an amplifier.

8. A multi-stage access shelf for coupling at least one desired telephone electrical circuit of a plurality of telephone electrical circuits to an access test bus, comprising:
   (a) access card means for selecting several of the telephone electrical circuits, at least one of which is the one desired telephone electrical circuit, said access card means being a first coupling stage; and
   (b) bus select means for selecting the one desired telephone electrical circuit from the several telephone electrical circuits and for normalling through the remaining telephone electrical circuits of the several telephone electrical circuits, the one desired telephone electrical circuit being connectable to the access test bus, and said bus select means being a second coupling stage.

9. A multi-stage access shelf, according to claim 8, wherein the access test bus includes first bus wires and second bus wires, and wherein said bus select means includes means for selectively switching the one desired telephone electrical circuit to the first wires or the second wires.

10. An access switch for connecting to an access test bus a plurality of wires constituting a plurality of two-wire circuits, comprising:
(a) first access means for closing a first group of N wires and for splitting the first group of N wires into 2N wires constituting a subset of p wires contained in N;
(b) second access means for closing a second group of M wires and for splitting the second group of M wires into 2M wires constituting a subset of s wires contained in M; and
(c) bus select means, coupled to said first and second access means, for connecting to the access test but selected combinations of p and s wires and for normalling through the unselected combinations of p and s wires, wherein p=2 and s=2.

11. An access switch, according to claim 10, wherein the test bus includes a plurality of bus wires, and said bus select means connects the selected combinations of p and s wires to selected bus wires of the access test bus.

12. An access shelf for coupling a plurality of telephone electrical circuits to an access test bus, the telephone electrical circuits including two-wire, four-wire or six-wire circuits or a combination thereof, comprising:
(a) controllable switching means for connecting a two-wire or a four-wire or a six-wire circuit to the access test bus, said controllable switching means being configurable to provide a four-wire access shelf in which a two-wire or a four-wire circuit is connectable to the access test bus and being configurable to provide a six-wire access shelf in which a six-wire circuit is connectable to the access test bus; and
(b) means for controlling said controllable switching means.

13. An access shelf, according to claim 12, wherein said controllable switching means is logically configurable to provide a four-wide access shelf or a six-wire access shelf.

14. An access shelf, according to claim 13, wherein said means for controlling comprises a physical switch being switchable between one position and another position to provide information corresponding, respectively, to the four-wire configuration and the six-wire configuration.

15. An access shelf, according to claim 12, wherein said controllable switching means comprises:
(a) first access card means, having a first output, for connecting a first group of the telephone electrical circuits to said first output;
(b) second access card means, having a second output, for connecting a second group of the telephone electrical circuits to said second output; and
(c) wherein said first access card means and said second access card means logically constitute one group for the four-wire configuration, and wherein said first access card means and said second access card means logically constitute first and second groups, respectively, fo the six-wire configuration.

16. An access shelf, according to claim 15, wherein said controllable switching means further comprises bus select means, connected to said first output and said second output, for selectively connecting telephone electrical circuits of said first group to the access test bus and for selectively connecting telephone electrical circuits of said second group to the access test bus.

17. A system for accessing a plurality of telephone electrical circuits, comprising:
(a) a common access test bus having a plurality of bus wires;
(b) a common control bus;
(c) at least one access shelf for connecting at least one of the telephone electrical circuits to at least one of said bus wires of said common access test bus in response to control signals on said common control bus, and wherein said system is adaptable to include at least one other said access shelf for connecting at least one other telephone electrical circuit to said at least one bus wire of said common access test bus in response to control signals on said common control bus, said one access shelf and said other access shelf being individually selectively controllable to connect said one telephone circuit or said other telephone circuit, respectively, to said at least one bus wire; and
(d) at test controller having programmable data processing means for selectively generating the control signals onto said common control bus to individually and directly control said one access shelf and said other access shelf to connect, respectively, said one telephone electrical circuit and said other telephone electrical circuit to said at least one bus wire, and said common access test bus and said common control bus being connected to said test controller and to said one access shelf and said other access shelf, and wherein either said one access shelf or said other access shelf can be controlled at one time to connect said one telephone electrical circuit or said other telephone electrical circuit, respectively, to said at least one bus wire.

18. An access switch for connecting to an access test bus a plurality of wires constituting a plurality of two-wire circuits, comprising:
(a) first access means for closing a first group of N wires and for splitting the first group of N wires into 2N wires constituting a subset of p wires contained in N;
(b) second access means for closing a second group of M wires and for splitting the second group of M wires into 2M wires constituting a subset of s wires contained in M; and
(c) bus select means, coupled to said first and second access means, for connecting to the access test bus selected combinations of p and s wires and for normalling through the unselected combinations of p and s wires, wherein p=2 and s=2, and wherein said bus select means can connect to the access test bus with respect to the subset of p wires none or one two-wire or two two-wire circuits.

19. An access switch for connecting to an access test bus a plurality of wires constituting a plurality of two-wire circuits, comprising:
(a) first access means for closing a first group of N wires and for splitting the first group of N wires into 2N wires constituting a subset of p wires contained in N;
(b) second access means for closing a second group of M wires and for splitting the second group of M wires into 2M wires constituting a subset of s wires contained in M; and (c) bus select means, coupled to said first and second access means, for connecting to the access test bus selected combinations of p and s wires and for normalling through the unselected combinations of p and s wires, wherein p=2 and s=2, and wherein said bus select means can connect to the access test bus with respect to the subset of s none or one two-wire circuit.

20. An access switch for connecting to an access test bus a plurality of wires constituting a plurality of two-wire circuits, comprising:
(a) first access means for closing a first group of N wires and for splitting the first group of N wires into 2N wires constituting a subset of p wires contained in N;
(b) second access means for closing a second group of M wires and for splitting the second group of M wires into 2M wires constituting a subset of s wires contained in M; and
(c) bus select means, coupled to said first and second access means, for connecting to the access test bus selected combinations of p and s wires and for normalling through the unselected combinations of p and s wires, wherein p=2 and s=2, and wherein said bus select means can connect to the access test bus with respect to the subset of p wires none or one two-wire or two two-wire circuits, and can connect to the access test bus with respect to the subset of s none or a two-wire circuit.

21. An access switch, according to claim 20, wherein said bus select means comprises a first output and a second output each being selectively openable and closeable to carry no wires or one two-wire or two two-wire circuits, respectively, of the subset of p wires and a third output being selectively openable and closeable to carry none or a two-wire circuit of the subset of p wires.

22. An access switch, according to claim 21, wherein said bus select means further comprises bus swapping means for connecting one two-wire circuit of said subset of p wires to said third output and for connecting one two-wire circuit of said subset of s wires to said first or second output.

23. A system for accessing a plurality of telephone electrical circuits, comprising:
(a) a common access test bus;
(b) a common control bus;
(c) at least one access shelf for connecting the plurality of telephone electrical circuits to said common access test bus in response to control signals on said common control bus, said one access shelf including means for coupling one of the telephone electrical circuits to said common access test bus while performing a test at said access shelf on another of the telephone electrical circuits; and
(d) a test controller having programmable data processing means for generating the control signals onto said common control bus to individually and directly control said coupling means of said one access shelf to so couple the one telephone electrical circuit and perform a test on the other telephone electrical circuit.

24. A system, according to claim 23, wherein said coupling means comprises means for monitoring the other telephone electrical circuit.

25. A system, according to claim 24, wherein said monitoring means comprises a high-impedance circuit.

26. A system, according to claim 24, wherein the monitoring means performs an audio monitoring test on the other telephone electrical circuit.

27. An access shelf for connecting a plurality of telephone electrical circuits to an access test bus connected to a test controller, said access shelf comprising:
(a) means for coupling one of the telephone electrical circuits to the test bus; and
(b) means for monitoring another of the telephone electrical circuits while the one telephone electrical circuit is coupled to the test bus.

28. An access shelf, according to claim 27, wherein said means for coupling and said means for monitoring each includes controllable relays and data storage means for storing data identifying selected controllable relays to control.

* * * * *